US010790900B2

(12) United States Patent
Perez-Ramirez et al.

(10) Patent No.: US 10,790,900 B2
(45) Date of Patent: Sep. 29, 2020

(54) ENHANCED FREQUENCY OFFSET TRACKING IN OPTICAL SIGNALS

(71) Applicant: Intel Corporation, Santa Clara, CA (US)

(72) Inventors: Javier Perez-Ramirez, North Plains, OR (US); Spencer Markowitz, Santa Clara, CA (US); Zoran Zivkovic, Hertogenbosch (NL); Nagarajan Muralidharan, Bangalore (IN); Ankitkumar Navik, Valsad (IN); Rufeng Meng, San Jose, CA (US); Richard Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/233,940

(22) Filed: Dec. 27, 2018

(65) Prior Publication Data

US 2020/0213004 A1    Jul. 2, 2020

(51) Int. Cl.
*H04B 10/079* (2013.01)
*H04B 10/516* (2013.01)
*H04N 5/455* (2006.01)

(52) U.S. Cl.
CPC ....... *H04B 10/0795* (2013.01); *H04B 10/516* (2013.01); *H04N 5/455* (2013.01)

(58) Field of Classification Search
None
See application file for complete search history.

(56) References Cited

U.S. PATENT DOCUMENTS

| 9,923,638 | B1* | 3/2018 | Perez-Ramirez | H04B 10/524 |
| 2014/0270799 | A1* | 9/2014 | Roberts | H04B 10/116 398/130 |
| 2015/0098709 | A1* | 4/2015 | Breuer | G01C 3/08 398/118 |
| 2016/0047890 | A1* | 2/2016 | Ryan | G01C 21/206 398/118 |
| 2017/0187455 | A1* | 6/2017 | Roberts | H04B 10/116 |
| 2017/0373753 | A1* | 12/2017 | Darabi | H04B 10/116 |

* cited by examiner

*Primary Examiner* — David W Lambert
(74) *Attorney, Agent, or Firm* — Eversheds Sutherland (US) LLP

(57) ABSTRACT

This disclosure describes systems, methods, and devices related to frequency offset tracking in optical signals. A device may identify modulated light received from a light source, wherein the modulated light is received at a frame rate, and wherein the modulated light is associated with pixel clusters. The device may determine light samples based on the pixel clusters, the light samples including a first light sample and a second light sample. The device may determine a vector norm between the first light sample and the second light sample using an oversampling factor. The device may determine that the vector norm is below a threshold. The device may determine a start frame delimiter (SFD) based on the vector norm. The device may demodulate the symbol based on the oversampling factor.

20 Claims, 15 Drawing Sheets

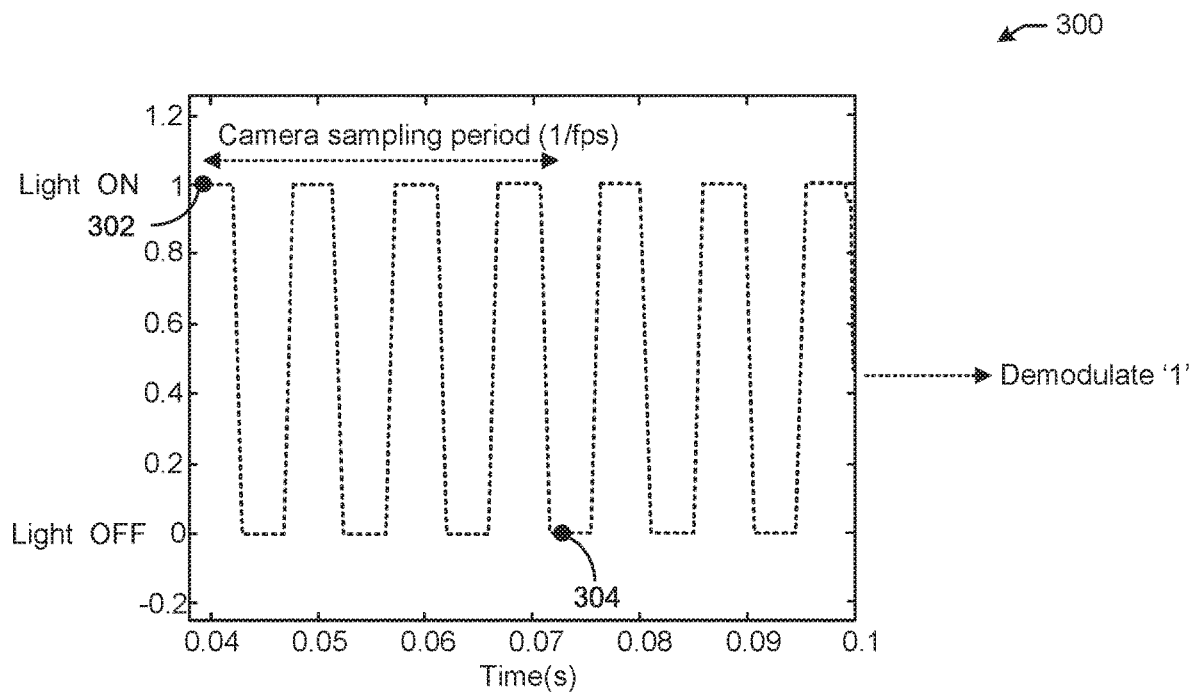
FIG. 3A
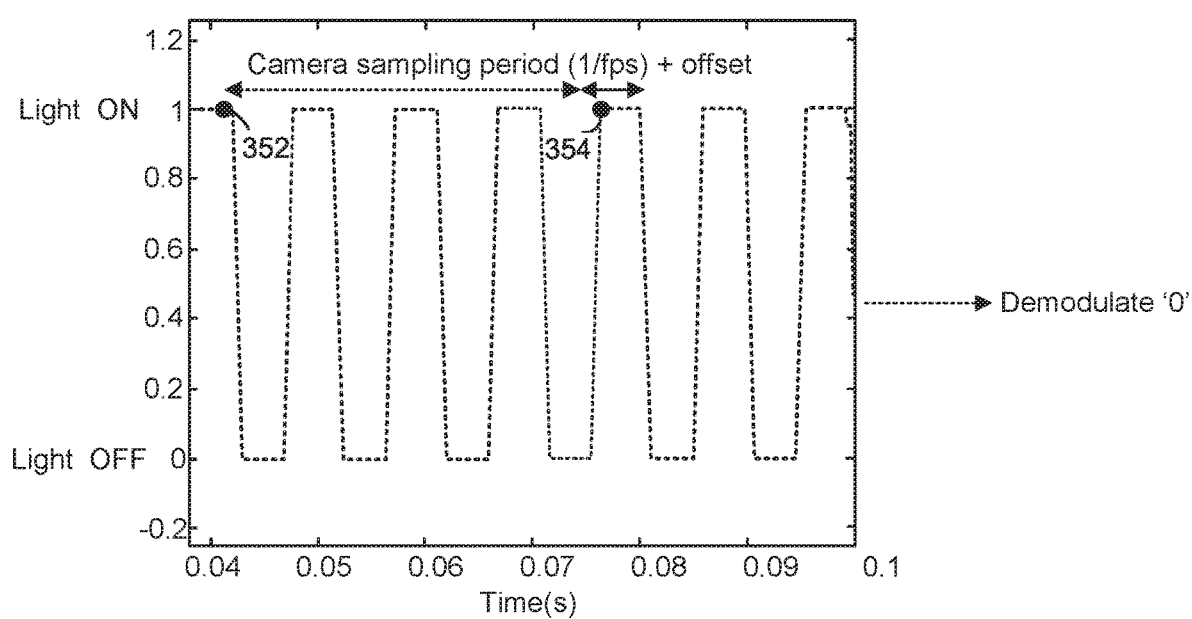
FIG. 3B
FIGs. 3A and 3B

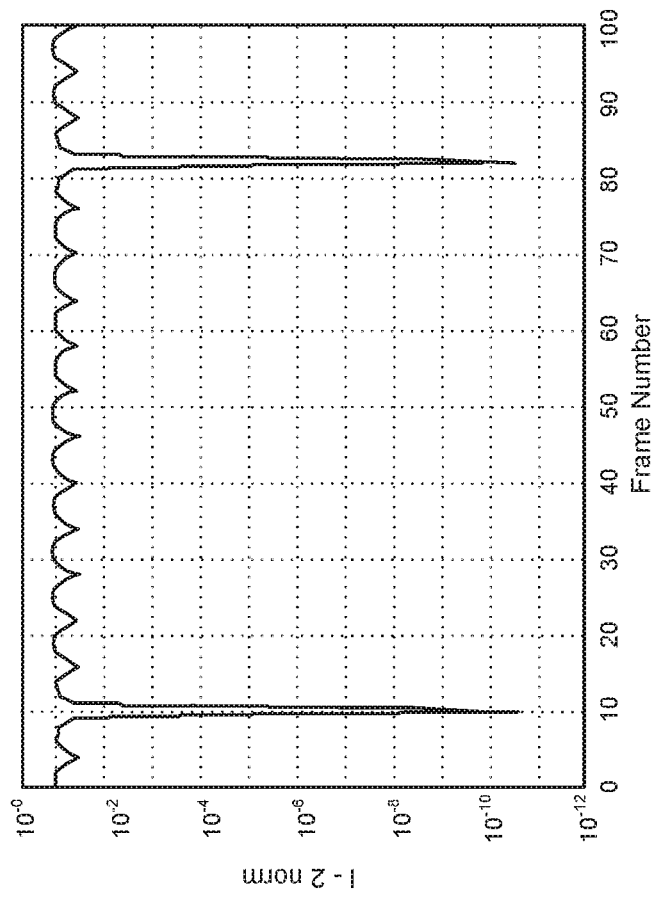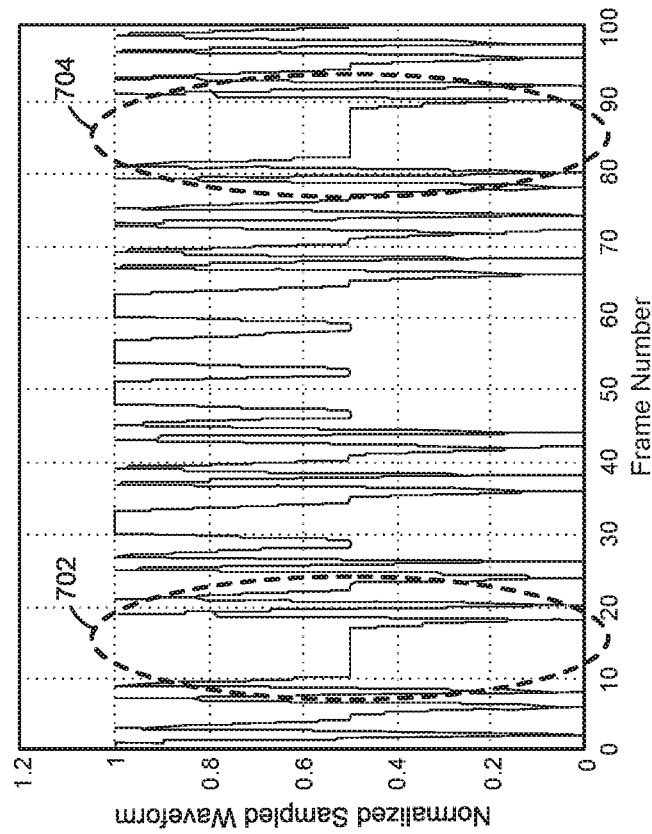
FIG. 7A
FIG. 7B
FIGs. 7A and 7B

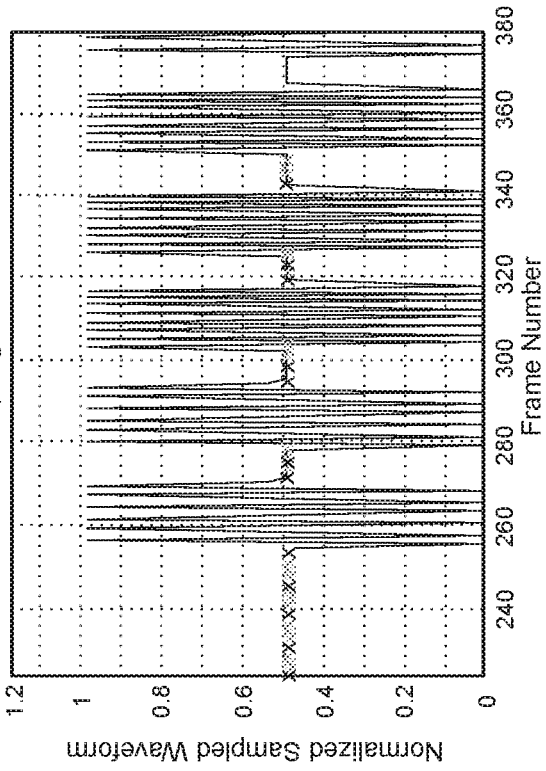
FIG. 8C
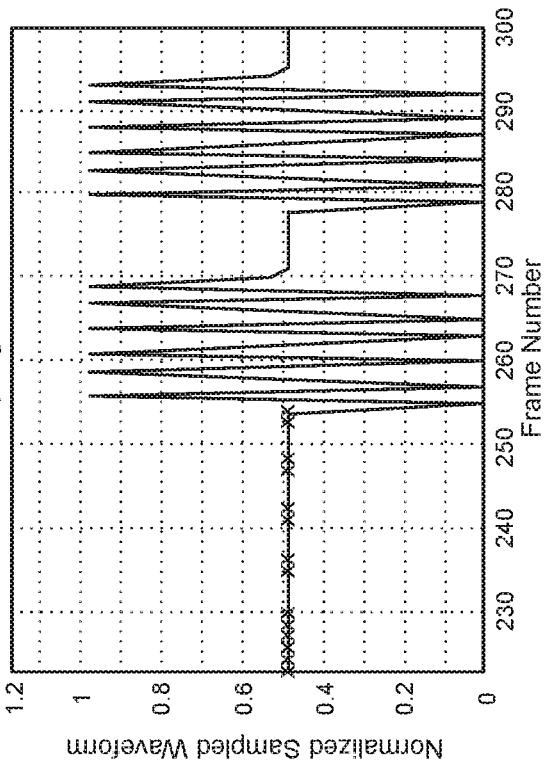
FIG. 8D
FIGs. 8C and 8D

ENHANCED FREQUENCY OFFSET TRACKING IN OPTICAL SIGNALS

TECHNICAL FIELD

This disclosure generally relates to systems and methods for optical signal modulation and, more particularly, to frequency offset tracking in optical signals.

BACKGROUND

Data may be transmitted using modulated lights. A camera may receive modulated lights as optical signals and process the optical signals. However, cameras may experience a frequency offset between a camera frame rate and a modulation clock, which may lead to inaccurate processing of modulated optical signals. There is a need to detect and correct the effects of such a frequency offset and improve the tracking of modulated optical signals.

BRIEF DESCRIPTION OF THE DRAWINGS

FIG. 3A illustrates exemplary effects of a frequency offset between a camera frame rate and a modulation clock, in accordance with one or more example embodiments of the present disclosure.

FIG. 3B illustrates exemplary effects of a frequency offset between a camera frame rate and a modulation clock, in accordance with one or more example embodiments of the present disclosure.

FIG. 7A illustrates an exemplary sampled waveform from a modulated light source, in accordance with one or more example embodiments of the present disclosure.

FIG. 7B illustrates an exemplary L-2 norm of the sampled waveform in FIG. 7A, in accordance with one or more example embodiments of the present disclosure.

FIG. 8C illustrates an exemplary effect of oversampling using an oversampling factor, in accordance with one or more example embodiments of the present disclosure.

FIG. 8D illustrates an exemplary effect of oversampling using an oversampling factor, in accordance with one or more example embodiments of the present disclosure.

DETAILED DESCRIPTION

Figure 1:
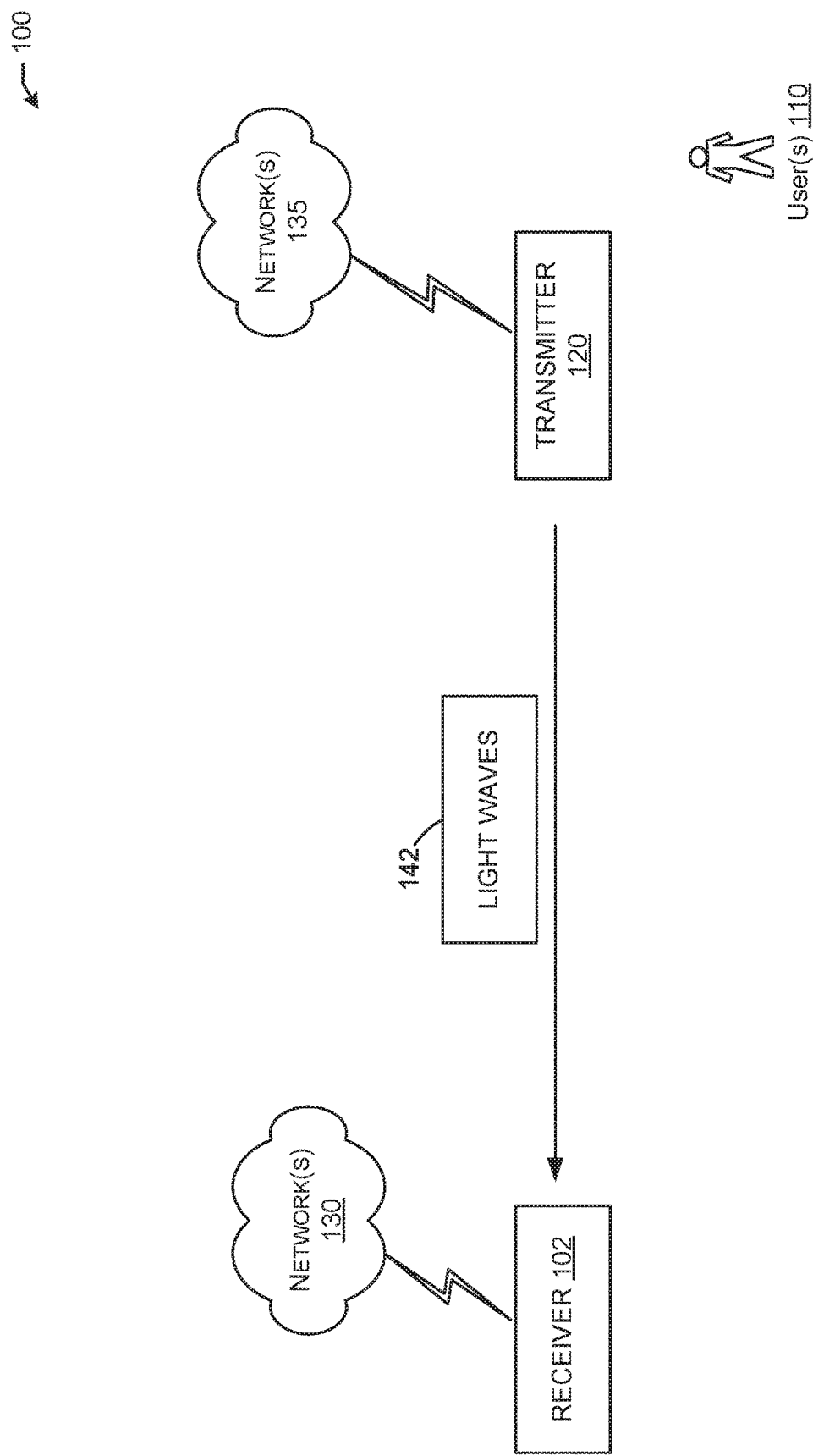
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The IEEE 802.15.7 standard defines visible light communications, which include a variable pulse position modulation waveform known as a composite waveform, and also include an under-sampled frequency shift on-off keying (UFSOOK) modulation waveform. UFSOOK accomplishes dimming by changing the duty cycle (e.g., the percentage of a ratio of pulse duration or pulse width to a waveform period) of mark and space OOK frequencies. Normally the duty cycle is 50%. Decreasing the duty cycle makes the light appear dimmer, for example. Increasing the duty cycle makes the light appear brighter. A UFSOOK preamble may be a SFD including consecutive video frames of high frequency ON-OFF keying followed by consecutive video frames of a UFSOOK logic one frequency.

Data may be transmitted through light by shifting the frequency between two discrete frequencies (e.g., a mark frequency and a space frequency). A mark frequency may correspond to a binary 0, and the space frequency may correspond to a 1. The mark frequency may correspond to a higher frequency than the mark frequency. Data may be indicated by light transitions between mark and space frequencies. A UFSOOK encoder may encode bits as OOK frequencies (e.g., ON-OFF blinking light emitting diodes) so that a logic zero may be represented by an OOK frequency that is an integer multiple of a camera frame rate, and so that a logic one may be represented by an OOK frequency that is an integer multiple of ½ a camera frame rate. For example, if the frame rate is 30 fps, then the OOK frequencies may be 120 Hz and 105 Hz.

Camera communications (CamCom) are a form of optical communications and represent a transmission of data using modulated lights acting as transmitters, and a digital camera acting as a receiver. Lights may be modulated using waveforms defined in the IEEE 802.15.7 standard and may be sent to a receiver. To use lights as a means of communication, waveforms may be assigned to modulate the lights as signals without compromising the intended signals. For example, to modulate light, the amplitude, phase, and/or frequency may change to allow for transmitting information which may be processed by a receiver. Different waveforms have been proposed for different types of camera sensors, including rolling shutter and global shutter cameras. Waveforms have been proposed to enable low-throughput communications using off-the-shelf digital rolling and global shutter cameras.

In some visible light communications, the presence of flickering lights and a cyclic redundancy check (CRC) of data extracted by light signals may be detected by a receiving device. However, some visible light communications require data extraction of all detected potential light sources, thereby increasing overall system latency and required computational resources. Some visible light communications may not identify or otherwise determine the data rate of the waveforms used to transmit light signals, and may rely too much on a CRC to take the place of determining a data rate, which would result in inaccurate signal processing because CRC is not meant to identify or otherwise determine a data rate. Camera devices may experience a frequency offset between a camera frame rate (e.g., the number of frames a camera may capture per second) and a light modulation clock (e.g., a light emitting diode modulation clock). It may be difficult to detect and correct frequency offsets between a light source and a camera. The frequency offsets may result in incorrect identification of light being ON or OFF, so resulting transitions between ON and OFF values used to demodulate light signals may be incorrectly identified, resulting in improper demodulation of light signals.

When sampling a light waveform, a device may identify boundaries of a light signal inaccurately, resulting in errors in sampling the light signal and in identifying the data associated with the light signal. By defining SFDs, which may include multiple guard periods, a device may identify the beginning of a symbol. SFDs may serve effectively as light preambles and may improve a device's ability to identify light symbols.

Existing visible light communications may benefit from a new waveform based on UFSOOK to enable tracking of a frequency offset when using modulated LED lights, for example. UFSOOK may be used to modulate light at high frequencies, such as frequencies higher than a human eye may perceive. A sampling method, such as one using the Nyquist Theorem, may allow for digitization of analog signals to obtain information from modulated light signals. When a camera captures light signals at a frequency at which a human eye may not perceive, the Nyquist Theorem may be used to obtain data from the light.

For example, if two frequencies are used and sampled in UFSOOK, the result may be a blinking pattern at one frequency and no blinking pattern at another frequency. The blinking pattern at different frequencies may be associated with or otherwise linked to a numeric value, for example, a binary 0 or 1 value. The values at different frequencies where humans may not see blinking lights may represent data which may be identified in optical signals. Symbols in UFSOOK waveforms may be formed by square waveforms operating at high frequencies (e.g., above 100 Hz) to avoid flickering. To modulate bits of the waveforms, the frequency of the square waveform in each symbol of the light signal may be selected so that when undersampled by a camera (e.g., at 30 frames per second), the resulting frequency may be 0 or $f_{cam}/2$, where $f_{cam}$ is the camera recording frame rate. When a camera samples at 60 frames per second (fps), selecting 150 Hz for modulating a 1 value (e.g., mark frequency) and selecting 120 Hz for modulating a 0 (e.g., space frequency) may result in alias frequencies of 30 Hz and 0 Hz, respectively. The alias frequencies, which may not be perceived by a human eye, may be used to demodulate data bits.

To delimit the boundaries of symbols, a high frequency square waveform may be appended at the beginning and end of the symbols (e.g., a guard band), with a frequency higher than the inverse of the camera exposure time $\tau_{cam}$ ($>10/\tau_{cam}$). As a result, the average received optical power may be extracted (e.g., proportional to the waveform duty cycle) by the camera, resulting in samples smaller than samples taken within the boundaries of each symbol period. The total symbol duration may be $6/f_{cam}$ seconds, with guard bands of $1/f_{cam}$ seconds long. A start frame delimiter may be formed by at least six consecutive guard bands followed by a mark symbol.

In CamCom systems, providing flicker free communication may be challenging, especially for off-the-shelf cameras operating at frame rates of about 30 fps. UFSOOK was designed to address this problem. On-off keying modulation was enabled by modulating lights during a symbol period with square wave form of a frequency typically higher than 100 Hz (e.g., human eye cut-off frequency). Different frequencies were chosen to modulate a '0' (space frequency) or a '1' (mark frequency). To extract the data from the modulated lights, the aliasing effect induced by the camera may be used to sample the alias frequencies corresponding to modulated bits.

To determine the beginning of a data frame, UFSOOK also defined a start frame delimiter (SFD). The SFD may be formed by a high frequency square wave form of a symbol duration followed by a mark symbol. The high speed frequency square waveform was designed so that its coherence time would be much lower than the camera exposure time. As a result, the camera may extract only the averaged light intensity.

Demodulation of UFSOOK symbols may involve sampling symbols at least twice (e.g., two consecutive camera frames). When introducing a frequency offset between the camera frame rate and a modulated waveform, alias frequencies extracted from each symbol may change. That may interfere with modulation and may generate errors. For example, when sampling a mark frequency, instead of a light pattern of ON-OFF, the pattern ON-ON may be detected incorrectly and modulated as a 0 instead of a 1.

Benefits of the aspects described in the present disclosure may include an effectively higher signal-to-noise ratio (SNR) and an increased range of transmission.

Example embodiments of the present disclosure relate to systems, methods, and devices for enhanced frequency offset tracking in optical signals.

In one or more embodiments, a novel algorithm may be used to detect the presence of modulated light sources compatible with UFSOOK waveforms. The start frame delimiter present in such waveforms may be used to enable detection and also align a camera receiver with modulated light sources to proceed with the demodulation/data extraction. The algorithm may enable communication at different data rates using a constant camera frame rate. The algorithm may provide CamCom to camera devices and to enable use cases such as indoor positioning or augmented reality experiences.

In one or more embodiments, a novel symbol design may be used to detect and correct the effect of frequency offsets when sampling UFSOOK signals. Rather than taking two samples per symbol for demodulation, six or more samples may be taken, increasing the symbol duration (e.g., to six camera frame periods $1/c_{fps}$ when using six samples, where $c_{fps}$ may be the camera frame rate). Frames one and six of the six samples may be used to track frequency offset between the camera and light modulation clock, while frames 2-5 may be used to extract modulated data. Increasing the number of samples per symbol may reduce overall system throughput, however, the symbols and use of an SFD may facilitate more effective tracking of frequency offsets between the camera and modulated clock to mitigate interference.

In one or more embodiments, to detect the presence of a SFD, the L-2 norm may be used as a metric to find the minimum distance between the expected SFD sequence and the received sampled pattern. The proposed algorithm operates as follows. (1) Detect lights at the camera image plane and associate pixel clusters with each of them. Pixel clusters are processed to generate a single sample per detected light source and frame. (2) Store samples from light source in an internal buffer. Once the buffer is full, normalize the stored samples every time a new sample enters the buffer. (3) Compute the l-2 norm between the stored samples. (4) Trigger detection of SFD if the l-2 norm is below a threshold. (5) Store the resulting l-2 norm into a buffer and find the smallest sample below the threshold. Use the temporal location of the sample as the beginning of a SFD and start demodulating. Note that the above algorithm only operates correctly when both the camera and the modulated LED clocks are properly configured ($f_s=f_{cam}/6$).

In one or more embodiments, a modification may be made to the previous algorithm to support multi-rate camera communications. The algorithm also detects when $f_s>(f_{cam}/6)$ or when lights have random modulation patterns, preventing the camera receiver from attempting data extraction from the selected light source. Color LED sources (red, blue and green) may be considered, where each color may be modulated using a different frequency. Frequencies for red ($f_{s,r}$), green ($f_{s,g}$) and blue ($f_{s,b}$) may be used to indicate the modulation frequency of red, green and blue colors, respectively. The color frequencies may be represented by $f_{s,r}<f_{cam}/6$, $f_{s,g}=f_{cam}/6$ and $f_{s,b}>f_{cam}/6$. Under these assumptions, the algorithm works as follows. (1) Detect lights at the camera image plane and associate pixel clusters with each of them. Pixel clusters are processed to generate a single sample per detected light source, color and frame. (2) Store samples from light source in internal buffer. Once the buffer is full, normalize the stored samples every time a new sample enters the buffer. (3) Compute the l-2 norm between the stored samples and the expected SFD sequence. A camera frame rate for sampling may be different than expected. Oversampling may refer to sampling transmitted symbols using a camera frame rate higher than what it is expected. For example, if $$f_s = \frac{f_{cam}}{6} = 5, \text{ with } f_{cam} = 30,$$

an oversampling factor of 8 would mean that $f_{cam,oversampled}=8f_{cam}=240$ fps. Using the frame rates 30, 60, 120 and 240, over-samplings of up to 8× may be obtained. (4) Store resulting l-2 norm into a buffer. (5) Trigger detection of SFD if the l-2 norm is below a threshold. (6) For a given camera frame rate and color, if after the previous steps multiple SFDs are detected for different oversampling rates, select lowest oversampling rate to estimate the camera oversampling factor. (7) Using the estimated camera oversampling factor, find the smallest l-2 sample below the threshold and use its temporal location as the beginning of a SFD for each color. (8) Proceed to demodulate data taking into account the oversampling factor.

In one or more embodiments, to provide information about whether the camera is sampling inside or outside the current symbol boundaries, it may be beneficial to modulate the beginning and end of a symbol (e.g., a guard period) using a square waveform with frequency cwf>>cfps. The guard periods may be defined as the first and last seconds of the 6/cfps seconds of the symbol, where cfps may refer to a camera frame rate. After camera integration during the camera exposure time (e.g., exposure time is set up to be >>1/cwf), the camera may extract the direct current (DC) value of the modulated waveform, which may be intended to be different from a light ON intensity level (e.g., a DC value may depend on the duty cycle of the modulated waveform). Note that perceived light intensity may be different from light ON and OFF levels when sampling in the boundaries of a symbol. The information may be used to determine correct sampling and compensate the frequency offset effect. Light patterns with zero or one state transition (e.g., between ON and OFF) may be demodulated as a 0 (e.g., a space frequency). Patterns with two or more state transitions may be demodulated as a 1 (e.g., a mark frequency).

In one or more embodiments, the enhanced bit decision and tracking algorithm may include the following steps. (1) Record a video using an appropriate exposure time. (2) Identify modulated lights and define regions of interest (ROIs) in an image of the video. (3) Synchronize using a SFD. Initialize the tracking algorithm by detecting the first data bit. (4) Analyze samples to make a tracking and bit decision (e.g., whether to compensate for fast or slow sampling). (5) Extract payload until finished or until next SFD arrives. For example, at step (4), if the sampling is slow (e.g., there is a negative frequency offset), the receiving device may keep the current last sample and load the next five samples. If the sampling is normal, the next six samples may be loaded. If the sampling is fast (e.g., there is a positive frequency offset), the receiving device may load the next seven samples and keep the last six samples. If a camera is too fast or slow, the camera may drift forward or backward to a next or previous symbol, resulting in the inaccurate processing of the light.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment 100, according to some example embodiments of the present disclosure. The network 100 may include one or more transmitter devices 120 and one or more receiver device(s) 102, which may communicate in accordance with IEEE 802.15.7 standards. The transmitter device(s) 120 may be mobile devices that are non-stationary (e.g., not having fixed locations) or may be stationary devices.

Figure 12:
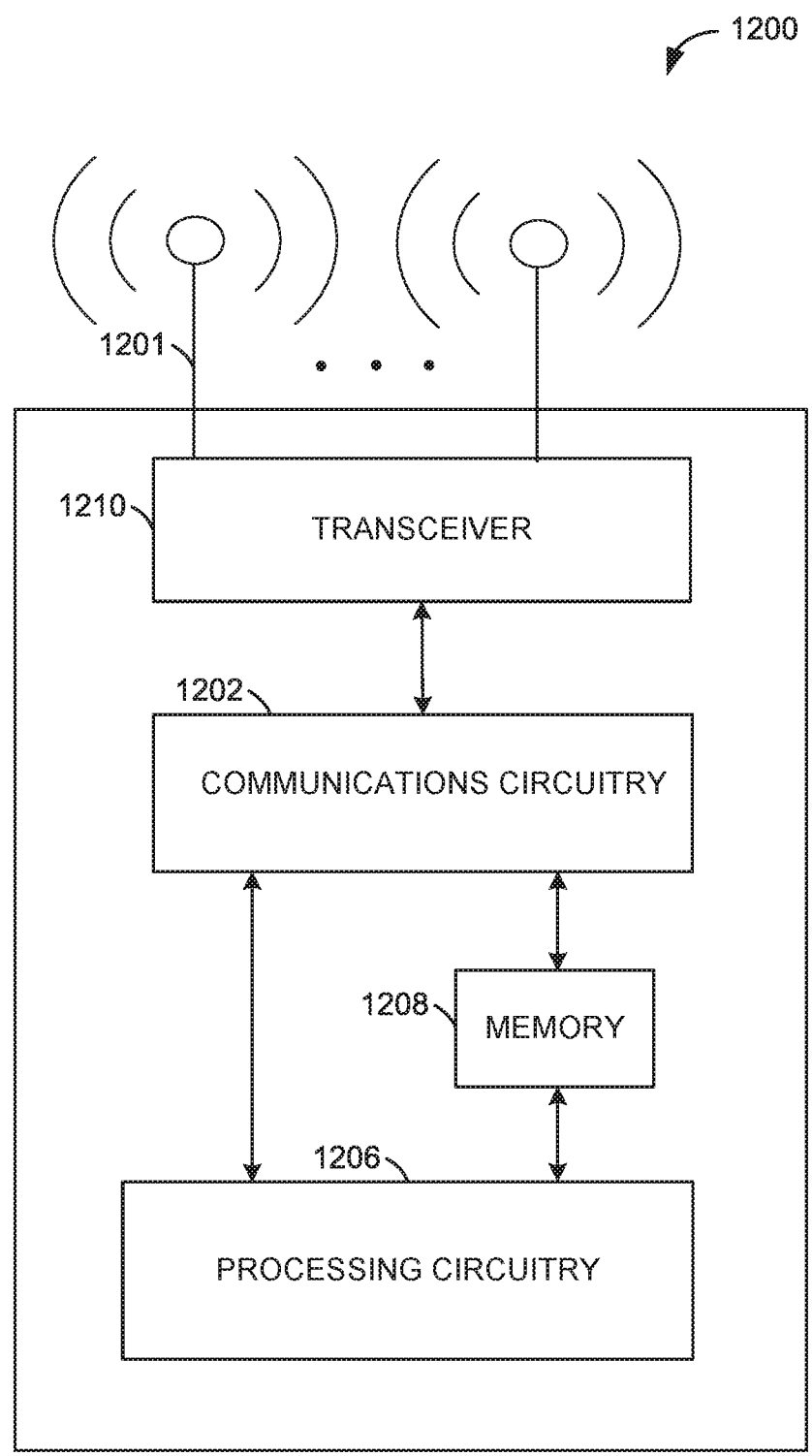
FIG. 12 shows a functional diagram of an exemplary communication station that may be suitable for use as a user device, in accordance with one or more example embodiments of the present disclosure.
Figure 13:
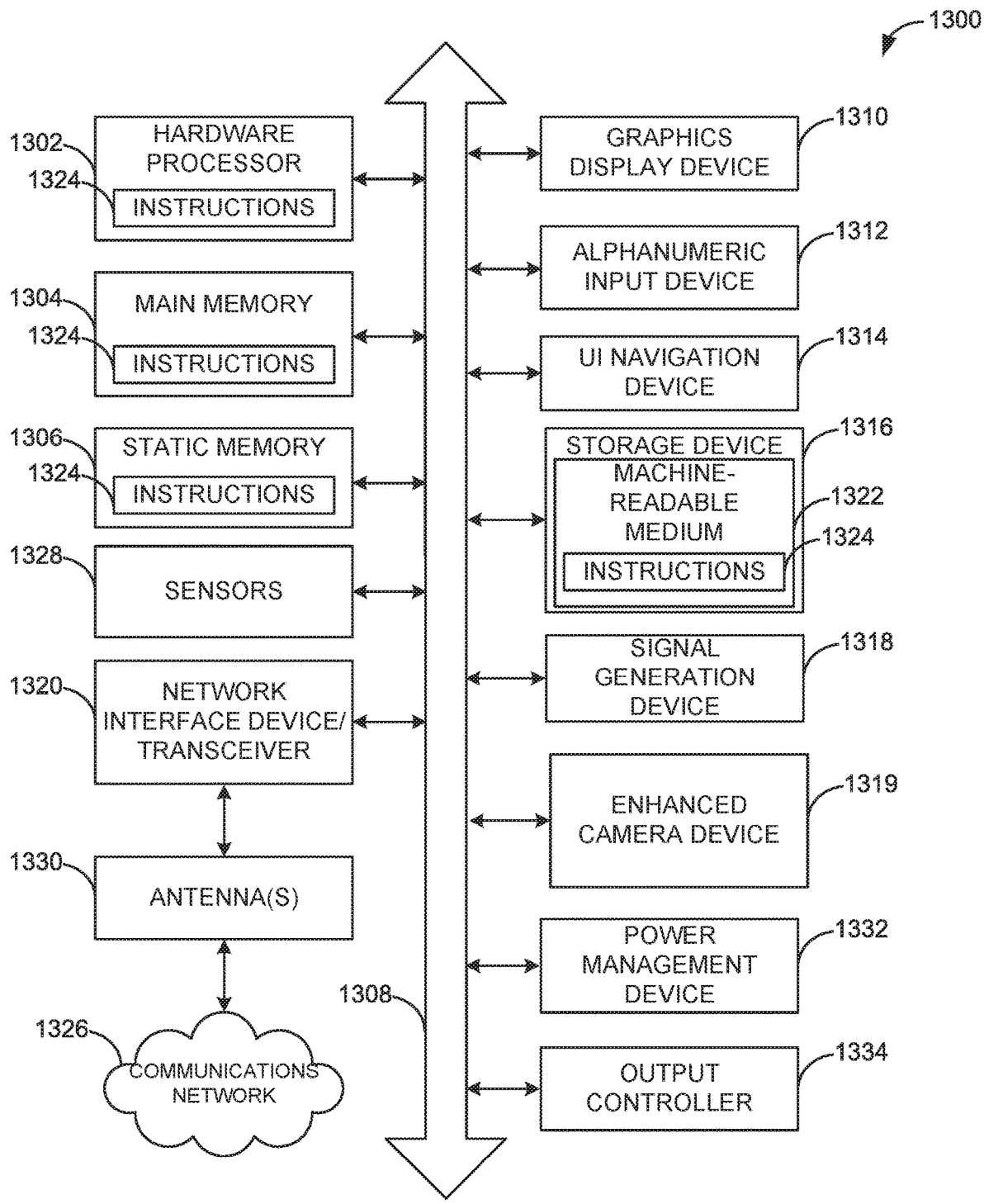
FIG. 13 is a block diagram of an example machine upon which any of one or more techniques (e.g., methods) may be performed, in accordance with one or more example embodiments of the present disclosure.

In some embodiments, the transmitter device(s) 120 and the receiver device(s) 102 may include one or more computer systems similar to that of the functional diagram of FIG. 12 and/or the example machine/system of FIG. 13.

One or more illustrative transmitter device(s) 120 and/or receiver device(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative transmitter device(s) 120 and the receiver devices 102 may be STAs, camera devices, and/or light-emitting devices. The transmitter device(s) 120 and/or receiver device(s) 102 may include any suitable processor-driven device including, but not limited to, a mobile device or a non-mobile, (e.g., static) device. For example, transmitter device(s) 120 and/or receiver device(s) 102 may include, a user equipment (UE), a camera or device with a camera, a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and may transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device may have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that may be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Any of the transmitter device(s) 120 and receiver device(s) 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more transmitter device(s) 120 and one or more receiver device(s) 102 may include one or more communications antennas. The one or more communications antennas may be any suitable type of antennas corresponding to the communications protocols used by the transmitter device(s) 120 and receiver device(s) 102. Some non-limiting examples of suitable communications antennas include visual light antennas, Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as light waves 142.

The one or more transmitter device(s) 120 and receiver device(s) 102 may include any suitable radio and/or transceiver for transmitting and/or receiving light signals in a bandwidth and/or channels corresponding to the communications protocols utilized by any transmitter device(s) 120 and receiver device(s) 102 to communicate with each other. The radio components may include hardware and/or software to modulate and/or demodulate communications signals according to pre-established transmission protocols. The radio components may further have hardware and/or software instructions to communicate via one or more visual light protocols, as standardized by the Institute of Electrical and Electronics Engineers (IEEE) 802.15.7 standards.

It is understood that the above descriptions are for purposes of illustration and are not meant to be limiting.

Figure 2A:
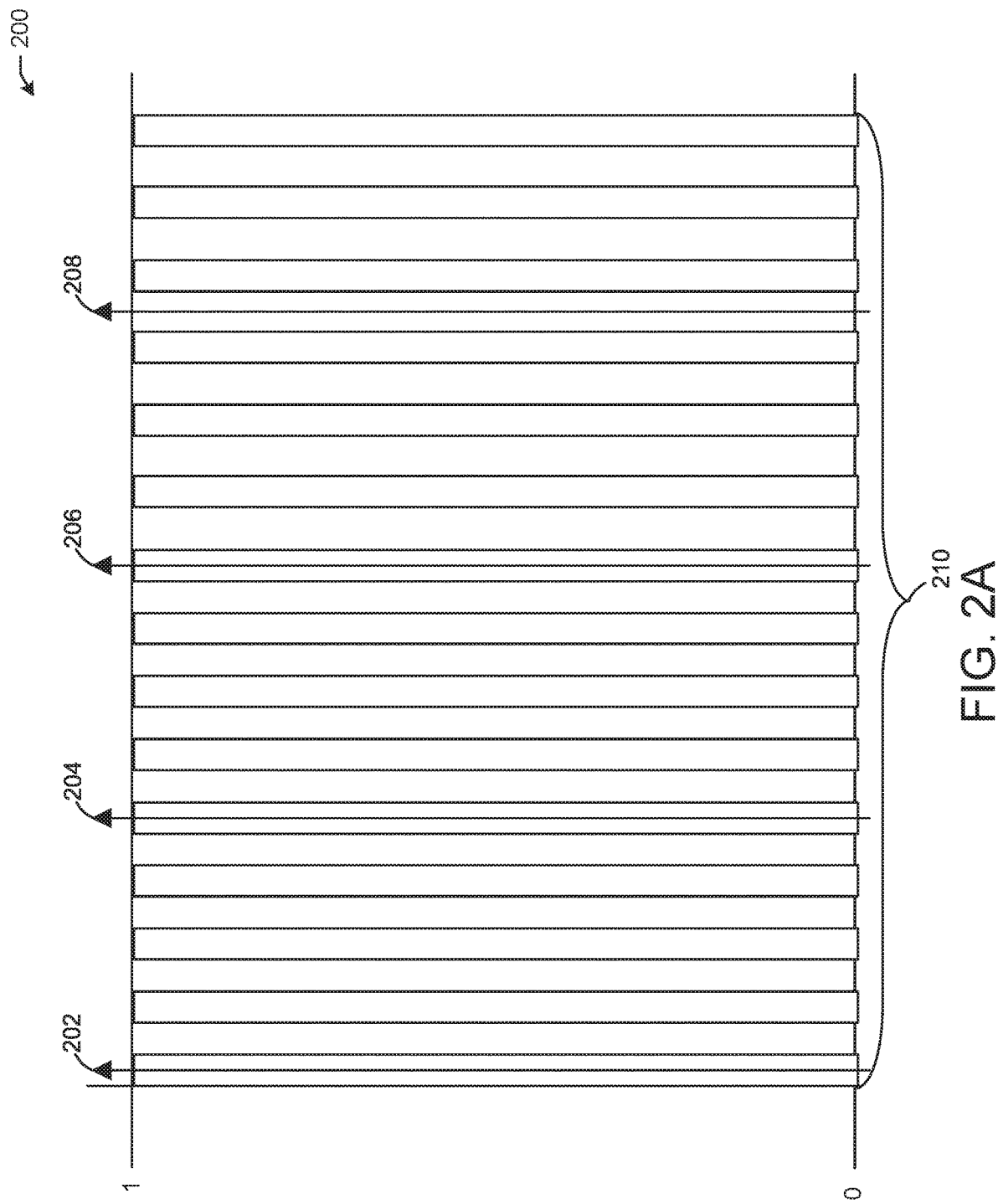
FIG. 2A illustrates exemplary under-sampled frequency shift on-off keying (UFSOOK) modulation of bits, in accordance with one or more example embodiments of the present disclosure.

FIG. 2A illustrates exemplary UFSOOK modulation 200 of bits, in accordance with one or more example embodiments of the present disclosure.

Referring to FIG. 2A, the modulation 200 of bits of bits may be a 0 or a 1. The arrows 202, 204, 206, and 208 represent camera samples, and the first two samples (e.g., arrow 202 and arrow 204) remain at a logic level light ON to demodulate a 0, while the second two samples (e.g., arrow 206 and arrow 208) toggle between light ON and light OFF to demodulate a 1. FIG. 2A shows how data is extracted from a UFSOOK waveform. The mark frequency is chosen to be 105 Hz, which after sampling by a camera operating at 30 fps appears to be blinking at 15 Hz. Likewise, the space frequency is chosen to be 120 Hz, with an alias frequency of 0 Hz. A symbol may be demodulated using two consecutive camera samples. After hard decoding and normalizing, when samples toggle from one logic level to the other, a '1' is extracted, otherwise, a '0' is extracted.

Figure 2B:
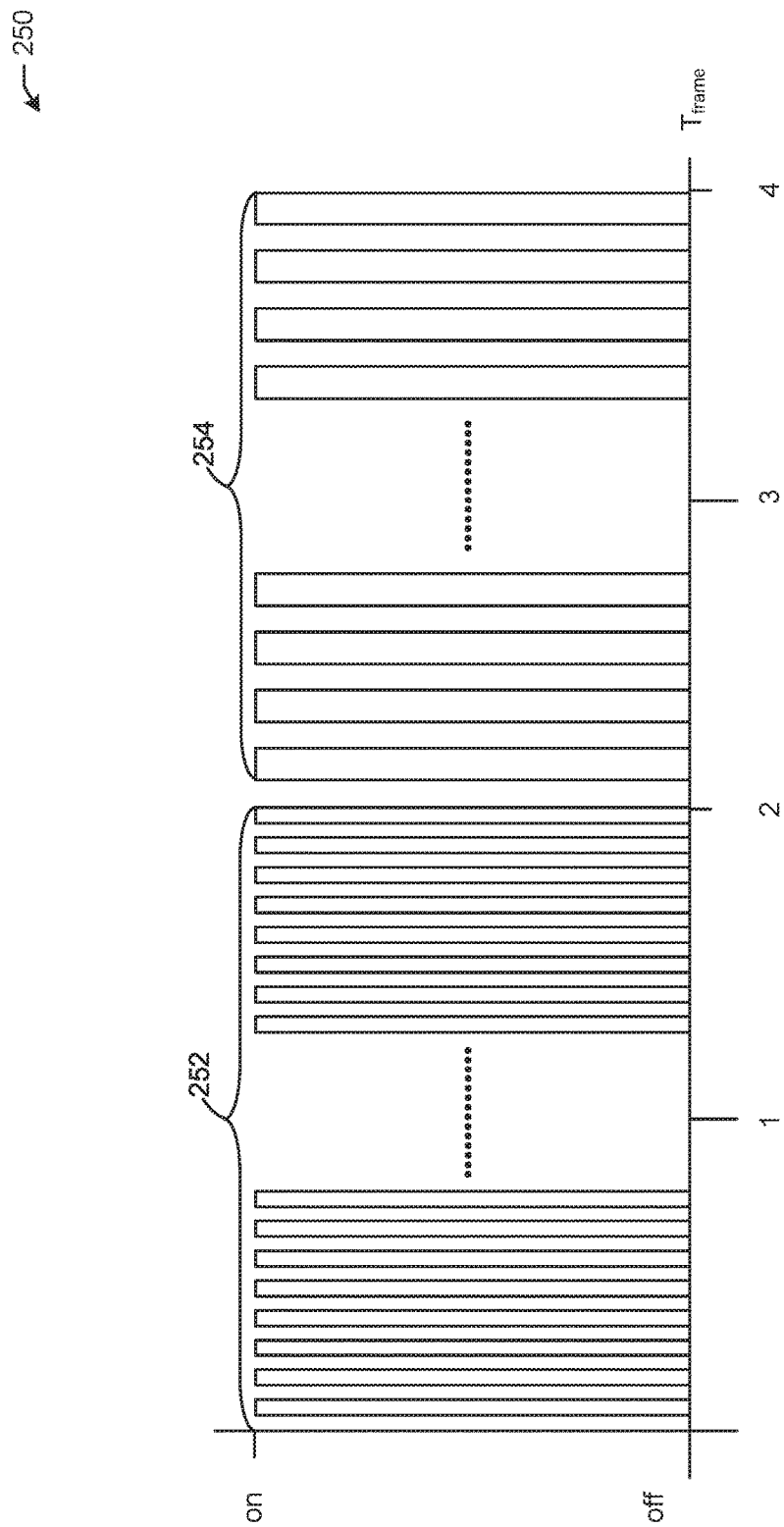
FIG. 2B illustrates an exemplary start frame delimiter, in accordance with one or more example embodiments of the present disclosure.

FIG. 2B illustrates an exemplary start frame delimiter 250, in accordance with one or more example embodiments of the present disclosure. Frame 252 and frame 254 may be sampled.

To determine the beginning of the data frame, UFSOOK defined a SFD as is shown in FIG. 2B. The SFD is formed by a high frequency square waveform of a symbol duration followed by a mark symbol. The high speed frequency square waveform was designed so that its coherence time would be much lower than the camera exposure time. As a result, the camera would extract only the averaged light intensity.

Referring to FIG. 2B, a one bit time (e.g., for frame 252) of high frequency OOK (e.g., >1 kHz with more than 1000/fps) and a one bit time (e.g., for frame 254) of mark frequency OOK (e.g., logic 1) are shown. Demodulation of UFSOOK symbols may involve sampling each symbol at least twice (e.g., two consecutive camera frames—frame 252 and frame 254). When introducing frequency offset between the camera frame rate and the modulated waveform, the alias frequencies extracted from a symbol may change. The change may interfere with demodulation and may generate errors. For example, when sampling a mark frequency, instead of the pattern light ON light OFF, the pattern light ON light ON may be obtained and be thus erroneously demodulated as a 0.

FIG. 3A illustrates exemplary effects of a frequency offset 300 between a camera frame rate and a modulation clock, in accordance with one or more example embodiments of the present disclosure. In FIG. 3A, a demodulate 1 result is shown.

FIG. 3B illustrates exemplary effects of a frequency offset 350 between a camera frame rate and a modulation clock, in accordance with one or more example embodiments of the present disclosure. In FIG. 3B, a demodulate 0 result is shown.

Referring to FIG. 3A, a sample 302 is taken during a camera sampling period (e.g., 1/fps). Another sample 304 may be taken. The sample 302 may be a high value (e.g., a 1), indicating a light ON. The sample 304 may be a low value (e.g., a 0), indicating a light OFF. The two samples, transitioning from a 1 to a 0 value, may result in demodulating a 1 value.

Referring to FIG. 3B, a sample 352 is taken during a camera sampling period (e.g., 1/fps). Another sample 354 may be taken. The sample 352 may be a high value (e.g., a 1), indicating a light ON. The sample 354 may be a high value (e.g., a 1), indicating a light ON. The two samples, remaining at a high value, may result in demodulating a 0 value. FIG. 3B shows the effect of a frequency offset when sampling and demodulating UFSOOK signals. For example, a '1' is modulated in FIG. 3A using a mark frequency of 105 Hz and camera frame rate of 30 fps. When a frequency offset is introduced in FIG. 3B, wrong demodulation is induced because the samples appear to remain at high values rather than transitioning between high and low values and resulting in a demodulation of 1 as shown in FIG. 3A.

In one or more embodiments, to detect and correct the effect of a frequency offset, rather than taking two samples per symbol for demodulation, a receiver device (e.g., receiver device 102 of FIG. 1) may take six samples, increasing the symbol duration to six camera frames periods $1/c_{fps}$, where $c_{fps}$ is the camera frame rate. Frames one and six may be used to track a frequency offset between the camera and light modulation clock, while frames 2-5 may be used to extract modulated data. Performance may be similar to existing methods when almost no frequency offset is present. However, the enhanced method remains at $10^{-3}$ packet error rate (PER) for frequency offsets ranging from 0 to $\pm 3*10^4$ PPM, while UFSOOK only offers such performance for offsets in the range of ±500 PPM (e.g., when using a signal-to-noise ratio of 100 dB, a mark frequency of 105 Hz, a space frequency of 120 Hz, a frame rate of 30 fps, a duty cycle of 50%, and an exposure of 0.1 ms).

Figures 4A, 4B:
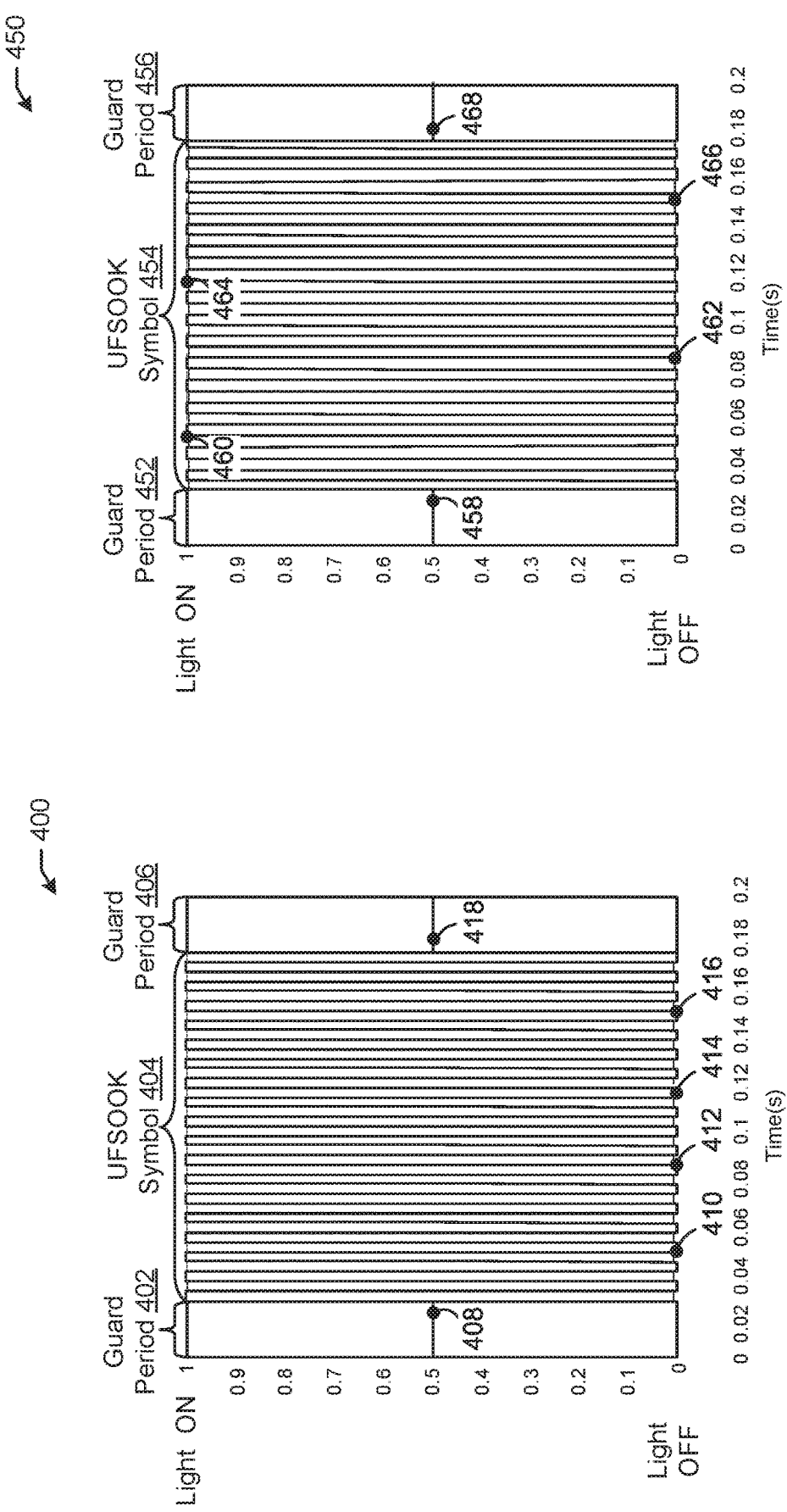
FIG. 4A illustrates an exemplary symbol for frequency offset tracking and bit modulation, in accordance with one or more example embodiments of the present disclosure.
FIG. 4B illustrates an exemplary symbol for frequency offset tracking and bit modulation, in accordance with one or more example embodiments of the present disclosure.

FIG. 4A illustrates an exemplary symbol for frequency offset tracking and bit modulation 400, in accordance with one or more example embodiments of the present disclosure.

FIG. 4B illustrates an exemplary symbol for frequency offset tracking and bit modulation 450, in accordance with one or more example embodiments of the present disclosure.

To provide information about whether the camera is sampling inside or outside the current symbol boundaries, the beginning and end of the symbol (e.g., guard period 402, guard period 406 in FIG. 4A; guard period 452 and guard period 456 in FIG. 4B) may be modulated using a square waveform with frequency $c_{wf} \gg c_{fps}$. The guard periods may be defined as the first and last $6/c_{fps}$ seconds of the symbol, with a UFSOOK symbol 404 in between the guard periods in FIG. 4A and with a UFSOOK symbol 454 in between the guard periods in FIG. 4B. The guard period 402, UFSOOK symbol 404, and guard period 406 of FIG. 4A and the guard period 452, UFSOOK symbol 454, and guard period 456 of FIG. 4B may be average light intensity determined by the camera.

After camera integration during the camera exposure time (e.g., exposure time may be $\gg 1/c_{wf}$), a camera (e.g., receiver device 102 of FIG. 1) may extract a DC value of the modulated waveform, which may be intended to be different from a light ON intensity level (e.g., DC value may depend on the duty cycle of the modulated waveform). The UFSOOK symbol 404 and UFSOOK symbol 454 may represent the normalized waveform seen by a camera after integration during shutter time. A 50% duty cycle may be considered for the guard period high frequency square waveforms shown in FIG. 4A and FIG. 4B, respectively.

Referring to FIG. 4A, camera sample 408 may represent sample $s_{-5}$ when $s_n$ represents a camera sample collected at $n/c_{fps}$. The set $[s_{-5}, s_{-4}, s_{-3}, s_{-2}, s_{-1}, s_0]$ may represent the samples collected to demodulate a symbol. For example, $s_{-4}$ may refer to camera sample 410, $s_{-3}$ may refer to camera sample 412, $s_{-2}$ may refer to camera sample 414, $s_{-1}$ may refer to camera sample 416, and so may refer to camera sample 418.

Referring to FIG. 4B, camera sample 458 may represent sample $s_{-5}$ when $s_n$ represents a camera sample collected at $n/c_{fps}$. The set $[s_{-5}, s_{-4}, s_{-3}, s_{-2}, s_{-1}, s_0]$ may represent the samples collected to demodulate a symbol. For example, $s_{-4}$ may refer to camera sample 460, $s_{-3}$ may refer to camera sample 462, $s_{-2}$ may refer to camera sample 464, $s_{-1}$ may refer to camera sample 466, and so may refer to camera sample 468.

To track frequency offset, the samples $[s_{-5}, s_0]$ may be quantized using the thresholds [0.33, 0.66], with quantization levels [0 0.5 1]. Samples $s_{-5}$ and so may be quantized to 0.5. When $s_0=0$ or 1, a fast camera sampling may be detected. Thus, for demodulating the current symbol the samples $[s_{-3}, s_{-2}, s_{-1}, s_0]$ may be considered instead of $[s_{-4}, s_{-3}, s_{-2}, s_{-1}]$. Likewise, when $s_{-5}=0$ or 1, a slow camera sampling may be detected and the samples $[s_{-5}, s_{-4}, s_{-3}, s_{-2}]$ may be used for demodulation. Table 1 below shows a summary of the tracking actions based on this discussion.

TABLE 1

Tracking actions based on quantized light patterns.

| Light Pattern After Quantization | Decision | Tracking Action (Current Symbol) | Tracking Action (Next Symbol) |
| --- | --- | --- | --- |
| 0.5, x, x, x, x, 0.5 | Correct Sampling | Demodulate using $[s_{-4}, s_{-3}, s_{-2}, s_{-1}]$ | Load next six samples |
| 1, x, x, x, x, 0.5 | Slow Sampling | Demodulate using $[s_{-5}, s_{-4}, s_{-3}, s_{-2}]$ | Keep current last sample, load next five samples |
| 0, x, x, x, x, 0.5 | | | |
| 0.5, x, x, x, x, 1 | Fast Sampling | Demodulate using $[s_{-3}, s_{-2}, s_{-1}, s_0]$ | Load next seven samples and keep the last six samples |
| 0.5, x, x, x, x, 0 | | | |

In Table 1, x may denote a sample being at any quantized level.

In one or more embodiments, symbols with mark frequency $n*c_{fps}+c_{fps}/2$ and with space frequency of $m*c_{fps}$ may be considered, where $c_{fps}$ may represent camera frame rate and n, m may be any elements. When sampled using a camera operating at 30 fps, mark frequencies may generate an alias frequency of 15 Hz. Likewise, space frequencies may generate an alias frequency of 0 Hz. Recalling that the first and last part of the symbol (e.g., guard periods) may be used for tracking, mark frequencies may generate two sampling patterns given by [on, off, on, off] and [off, on, off, on], and space frequencies two sampling patterns given by [on, on, on, on] and [off, off, off, off]. To detect the presence of an error in the sampled pattern and correct the error, the mapping shown in Table 2 below may be used.

TABLE 2

Demodulation of proposed UFSOOK symbol mapping illegal sample sequences to demodulated bits.

| Light Pattern $[s_{-4}, s_{-3}, s_{-2}, s_1]$ (ON - 1, OFF - 0) | Number of Transitions between 0 and 1 | Decision |
| --- | --- | --- |
| 1111 | 0 | 0 |
| 1110 | 1 | 0 |
| 1100 | 1 | 0 |
| 1000 | 1 | 0 |
| 0000 | 0 | 0 |
| 0111 | 1 | 0 |
| 0011 | 1 | 0 |
| 0001 | 1 | 0 |
| 1010 | 3 | 1 |
| 1101 | 2 | 1 |
| 1001 | 2 | 1 |
| 1011 | 2 | 1 |
| 0101 | 3 | 1 |
| 0010 | 2 | 1 |
| 0110 | 2 | 1 |
| 0100 | 2 | 1 |

As shown in Table 2, patterns with no transitions or a single state transition (between ON and OFF/0 and 1) are demodulated as a "0" (space frequency). Patterns with two or three state transitions are demodulated as a "1" (mark frequency). Note that this approach works when a maximum of one undesired state transition occurs within a symbol duration due to interference and/or frequency offset. The enhanced algorithm successfully corrects frequency offsets of about $3\times10^6$ PPM of the camera frame rate (e.g., 30±1 fps) with PER<10.

To modulate bits, the frequency of the square waveform in each symbol may be selected such that when under-sampled by a slow off-the-shelf camera (e.g., 30 fps), the resulting alias frequency may be either 0 or $f_{cam}/2$, where $f_{cam}$ may represent the camera recording frame rate. For example, for a camera operating at 60 fps, selecting 150 Hz for modulating a "1" (mark frequency) and selecting 120 Hz for modulating a "0" (space frequency) may result in the alias frequencies of 30 and 0 Hz respectively. These alias frequencies extracted by the camera receiver—not perceived by the human eye—may be used to demodulate data bits. To delimit the boundaries of symbols, a high frequency square waveform may be appended at the beginning and end of the symbols (e.g., as guard bands), the guard bands having a frequency higher than the inverse of the camera exposure time $\tau_{cam}$ (>$10/\tau_{cam}$). As a result, only the average received optical power may be extracted (e.g., proportional to the waveform duty cycle) by the camera, resulting in samples smaller than samples taken within the boundaries of each symbol period. The total symbol duration may be $6/f_{cam}$ seconds, with guard bands $1/f_{cam}$ seconds long. FIGS. 4A and 4B show respective symbol set examples of the described waveform.

Figure 5:
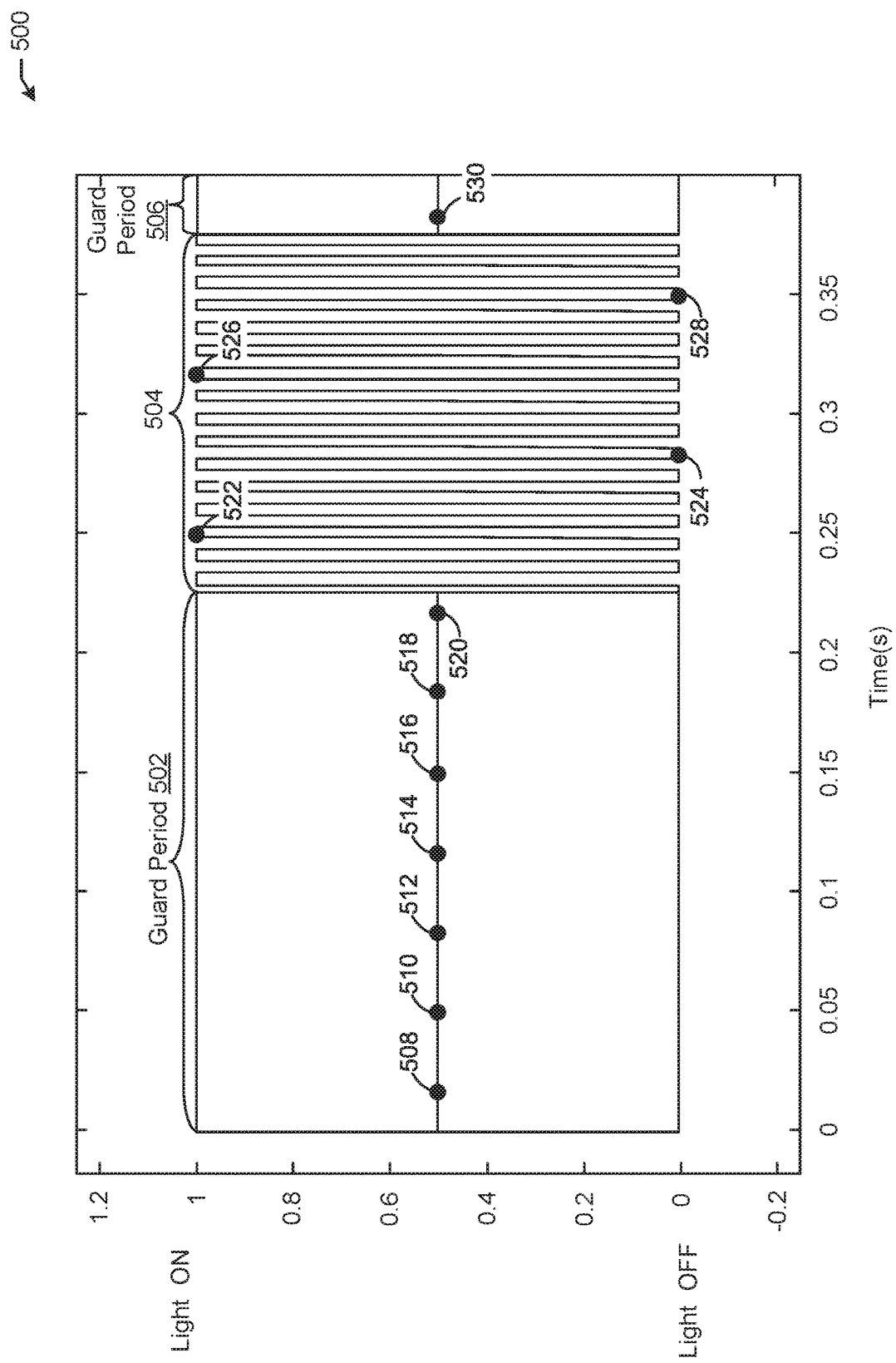
FIG. 5 illustrates an exemplary enhanced start frame delimiter, in accordance with one or more example embodiments of the present disclosure.

FIG. 5 illustrates an exemplary enhanced start frame delimiter 500, in accordance with one or more example embodiments of the present disclosure.

Referring to FIG. 5, a long guard period symbol (e.g., guard period 502) may be followed by a mark symbol 504, and then another guard period 506. After camera integration and sampling, a unique sequence is generated that can be used for determining the start of the frame. Camera sample 508, camera sample 510, camera sample 512, camera sample 514, camera sample 516, camera sample 518, and camera sample 520 may be taken during the guard period 502 and may correspond to values of about 0.5. Camera sample 522, camera sample 524, camera sample 526, and camera sample 528 may be taken during the mark symbol 504. Camera sample 530 may be taken during the guard period 506. The six camera samples taken before camera sample 520 may indicate a guard period to a receiver device (e.g., receiver device 102 of FIG. 1).

Still referring to FIG. 5, camera sample 522 may be taken when the mark symbol 504 is at a high value (e.g., 1). Camera sample 524 may be taken while the mark symbol 504 is at a low value (e.g., 0). Camera sample 526 may be taken when the mark symbol 504 is at a high value (e.g., 1). Camera sample 528 may be taken while the mark symbol 504 is at a low value (e.g., 0). The camera samples taken during the mark symbol 504 may include three transitions (e.g., from 1 to 0, from 0 to 1, and from 1 to 0). Using Table 2, for example, three transitions may result in a demodulation of value 1. Therefore, the samples taken in between the guard period 502 and the guard period 506 (e.g., corresponding to $[s_{-4}, s_{-3}, s_{-2}, s_{-1}]$) may indicate that the light pattern may be considered a mark symbol (e.g., mark symbol 504).

For example, for a camera operating at 60 fps, selecting 150 Hz for modulating a "1" (mark frequency) and selecting 120 Hz for modulating a "0" (space frequency) may result in the alias frequencies of 30 and 0 Hz, respectively. These alias frequencies extracted by a camera receiver—not perceived by the human eye—may be used to demodulate data bits in a light signal.

Cameras operate with a discrete number of frame rates. For example, cameras may operate with frame rates $f_{cam}$=30, 60, 120 and 240 fps. Additional frame rates may be used. To detect the presence of a SFD, the L2 norm (e.g., a Euclidian/vector norm) may be used as a metric to find the minimum distance between the expected SFD sequence and the received sampled pattern. The proposed algorithm may operate as follows. (1) Detect lights at the camera image plane and associate pixel clusters with each of them. Pixel clusters may be processed to generate a single sample per detected light source and frame $s_k$, where k=1, 2, . . . is the index denoting the k-th camera frame. (2) Store samples from light source in internal first in, first out (FIFO) buffer. Once the buffer is full, normalize the stored samples in a different buffer and use the normalized samples to determine the l-2 norm. The FIFO buffer may store the raw, non-normalized samples. (3) Determine the l-2 norm between the stored samples $s_k=[s_{k+1-N}, s_2, \ldots, s_k]^T$, where N is the buffer size, and the expected normalized SFD sequence as follows: $b_k=(s_k-p)^{T}*(s_k-p)$ where p is the expected normalized SFD sequence of size N. N may be designed to be equal to six, with a SFD sequence defined to be equal to the first half of the SFD. To increase the SFD detection capabilities, $p=[0.5, 0.5, 0.5, 0.5, 0.5, 0.5, 0.5, 0.5]^T$ (N=8) where two additional samples may be included to account for the guard band of the symbol preceding the SFD (e.g., in cases when modulated light sources are continuously transmitting data packets) and the first guard band may correspond to the symbol contained in the second part of the SFD. (4) Trigger detection of a SFD if the l-2 norm is below a threshold β. (5) Store the resulting l-2 norm into a buffer b of size M (M>>N) and find the smallest sample below the threshold β. The temporal location of this sample may be used as the beginning of a SFD, and then the device may begin demodulating.

Figure 6:
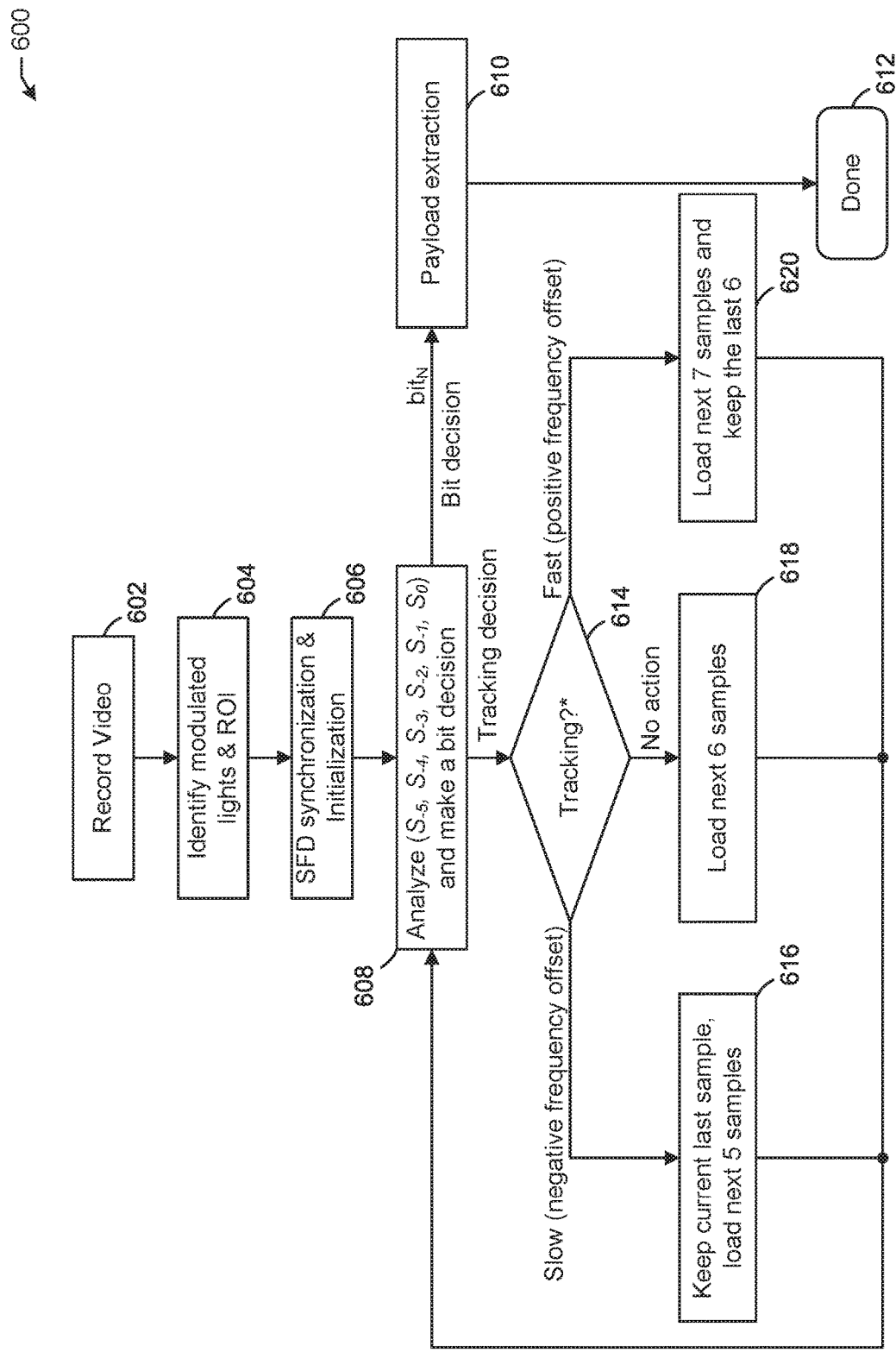
FIG. 6 depicts a flow diagram of an illustrative process for enhanced tracking in optical communications, in accordance with one or more example embodiments of the present disclosure.

FIG. 6 depicts a flow diagram of an illustrative process 600 for enhanced tracking in optical communications, in accordance with one or more example embodiments of the present disclosure.

Referring to FIG. 6, a camera (e.g., receiver device 102 of FIG. 1) may record video at block 602. Video may be recorded using an appropriate exposure time. At block 604, the camera may identify modulated lights and define ROIs from the light of the recorded video. ROIs may include regions where light samples may be taken. At block 606, the camera may perform SFD synchronization and initialization. The camera may identify SFDs and initialize the tracking algorithm by detecting a first data bit from the light of the recorded video. At block 608, the camera may analyze samples (e.g., sample set $[s_{-5}, s_{-4}, s_{-3}, s_{-2}, s_{-1}, s_0]$) and make a bit decision (e.g., according to Table 2 based on the number of transitions between 0 and 1 values identified using samples $[s_{-4}, s_{-3}, s_{-2}, s_{-1}]$). Once a bit decision has been made (e.g., a mark frequency or a space frequency has been determined), alias frequencies may be extracted by the camera and used to demodulate bits (e.g., payload extraction at block 610). The process may end at block 612 once payload extraction has completed or once another SFD has been identified.

Still referring to FIG. 6, based on the analysis of samples (e.g., sample set $[s_{-5}, s_{-4}, s_{-3}, s_{-2}, s_{-1}, s_0]$), the camera may execute the tracking algorithm at block 614. Using the tracking algorithm (e.g., according to Table 1), the camera may determine a tracking action based on whether the camera is sampling at a proper rate, is sampling too slowly, or is sampling too quickly. At block 616, the camera may determine that sampling is too slow (e.g., the camera may identify a negative frequency offset). To adjust for the slow sampling, the camera may take a tracking action including keeping the current last sample, and loading the next five samples. At block 618, the camera may determine that sampling is correct/proper, and may take a tracking action of loading the next six samples. At block 620, the camera may determine that the sampling is too fast (e.g., the camera may identify a positive frequency offset), and may take a tracking action including loading the next seven samples and keeping the last six samples.

Note that the tracking algorithm may operate correctly when both the camera (e.g., receiving device 102 of FIG. 1) and its modulated light emitting diode (LED) clocks are properly configured (e.g., $f_s=f_{cam}/6$). A modification to existing methods may support multi-rate camera communications. For example, the modified algorithm detects when $f_s>(f_{cam}/6)$) or when lights have random modulation patterns, preventing a camera receiver from attempting data extraction from a selected light source (e.g., transmitter device 120 of FIG. 1). In one example, color LED sources (e.g., red, blue and green) may be considered, and each color may be modulated using a different frequency. Frequency values $f_{s,r}$, $f_{s,g}$ and $f_{s,b}$ may be used to indicate the modulation frequency of red, green and blue, respectively. For example, $<f_{cam}/6$, $f_{s,g}=f_{cam}/6$ and $f_{s,b}>f_{cam}/6$. Under these assumptions the algorithm works as follows.

(1) Detect lights at a camera image plane and associate pixel clusters with each of them. Process pixel clusters and generate a single sample $s_k^c$ per detected light source, color, and frame, where k=1, 2, . . . is the index denoting the k-th camera frame and c=r, g, b denotes the LED color (e.g., red, green or blue). (2) Store samples from light source in internal FIFO buffer $s_k^c=[s_{k+1-N}^c, \ldots, s_k^c]^T$, where N is the buffer size. Once the buffer is full, normalize the stored samples when a new sample enters the buffer. (3) Compute the l-2 norm (e.g., Euclidian/vector norm) between the stored samples $s_k^c$ and the expected SFD sequence as follows: $b_k^{c,i}=(s_k^c(N+1-(1:8\cdot2^i))-p^i)^{T}*(s_k^c(N+1-(1:8\cdot2^i))-p^i)$ where i=0, 1, 2, 3 is the index indicating the oversampling factor $2^i$ and $p^i=[0.5, 0.5, \ldots, 0.5]^T$, of size $8 \cdot 2^i$. The oversampling factor may be used to account for when the camera oversamples the transmitted symbols. Using frame rates 30, 60, 120 and 240, over samplings of up to 8× may be obtained. To improve the detection capabilities, the presence of guard bands in symbols following the SFD may be used. For example, the l-2 norm may be defined as $b_k^{c,i}=(s_k^c(N+1-(1:8\cdot2^i))-p^i)^{T*}(s_k^c(N+1-(1:8\cdot2^i))-p^i)+\Sigma_{j=1:G}\Sigma_{m=0:(2^{i+1}-1)}s_k^c(N+1-(8\cdot2^i+j\cdot6\cdot2^i-m))-0.5$ where G is the total number of additional guard bands considered. To guarantee the capturing of a full SFD regardless the oversampling factor, $N>12\cdot8$, where 12 is the number of samples corresponding to a SFD when sampled at the correct camera frame rate (e.g., no oversampling) and 8 is the maximum oversampling factor.

Figures 8A, 8B:
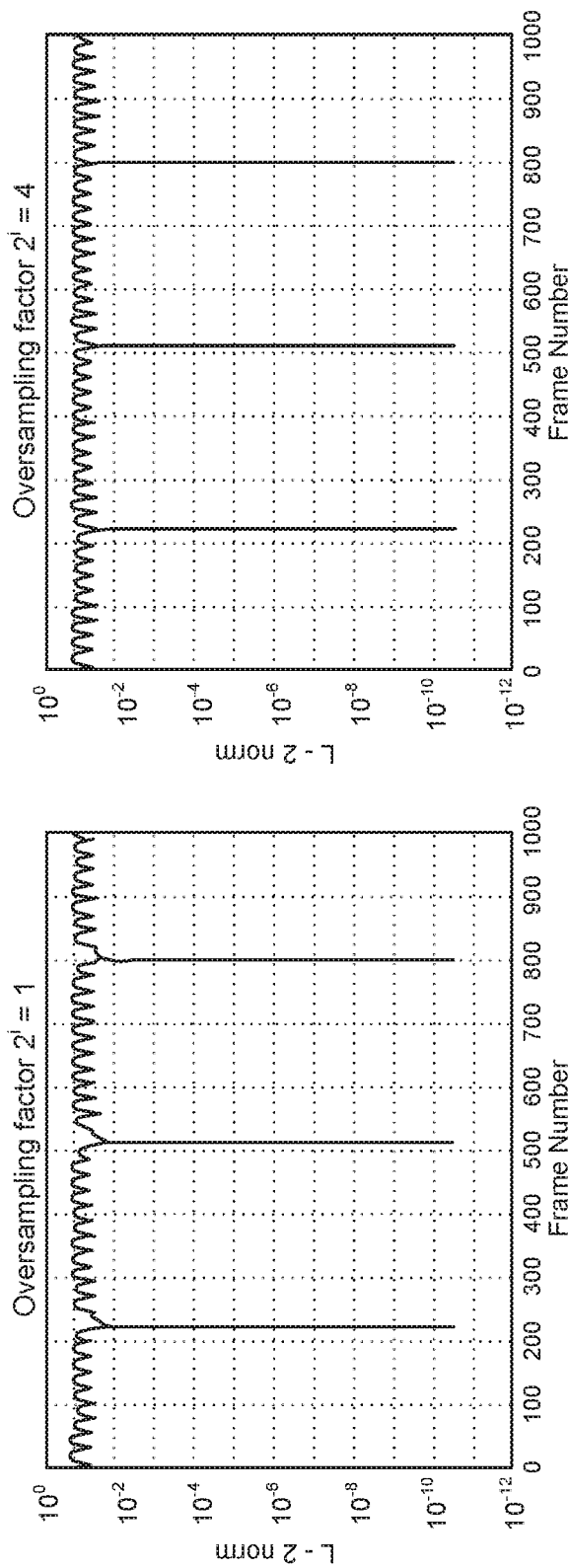
FIG. 8A illustrates an exemplary effect of oversampling using an oversampling factor, in accordance with one or more example embodiments of the present disclosure.
FIG. 8B illustrates an exemplary effect of oversampling using an oversampling factor, in accordance with one or more example embodiments of the present disclosure.

(4) Store the resulting l-2 norm into a buffer $b^{c,i}=[b_1^{c,i}, \ldots, b_M^{c,i}]$ of size M (M>>N). The number of buffers required may be equal to the maximum number of oversampling factors for a given camera frame rate. Thus, if a camera's operational frame rate is 240, a total of four buffers per color may be required. If $f_{cam}=30$, only one buffer may be required. (5) Trigger detection of SFD if l-2 norm is below the threshold β. When considering multiple colors, SFD may be detected in each sample buffer $s_k^c$. In such an embodiment, only two SFDs may be detected corresponding to the colors red and green. The SFD corresponding to the blue color may not be detected because $f_{s,b}>f_{cam}/6$. To improve the detection probability and reduce the probability of false detection, the Peak to Average Power Ratio (PAPR) of samples $s_k^c(N+1-(8\cdot2^i+G\cdot6\cdot2^i):N)$ in each buffer associated with a SFD detection may be determined, and only sequences with PAPR>Γ may be considered as true candidates (e.g., where Γ is a threshold value). PAPR may be determined to avoid triggering false detection when high camera oversampling of the SFD occurs and when the l-2 norm is determined using low oversampling factors, (e.g., i=0,1). As shown in FIG. 8A and FIG. 8B below, i=0 and i=2 may provide similar results in terms of l-2 norm. However, as shown in FIG. 8C below, high camera oversampling of the SFD may cause the samples involved in the computation of the l-2 norm to fall in the first half of the SFD, triggering a detection with a false estimated oversampling factor. For a given camera frame rate and color, if after the previous steps multiple SFDs are detected for different oversampling rates, select lowest oversampling rate to estimate the camera oversampling factor.

(7) Using the estimated camera oversampling factor, find the smallest l-2 sample below the threshold β and use its temporal location as the beginning of a SFD for each color. (8) Proceed to demodulating data taking into account the oversampling factor.

FIG. 7A illustrates an exemplary sampled waveform 700 from a modulated light source, in accordance with one or more example embodiments of the present disclosure.

FIG. 7B illustrates an exemplary L-2 norm 750 of the sampled waveform 700 in FIG. 7A, in accordance with one or more example embodiments of the present disclosure.

As can be seen, the l-2 (L-2) norm may significantly decrease when a SFD is detected. The lowest value in FIG. 7B may correspond to the presence of a SFD. For example, the lowest peak may represent the beginning of a light packet.

FIG. 8A illustrates an exemplary effect 800 of oversampling using an oversampling factor, in accordance with one or more example embodiments of the present disclosure.

FIG. 8B illustrates an exemplary effect 830 of oversampling using an oversampling factor, in accordance with one or more example embodiments of the present disclosure.

FIG. 8C illustrates an exemplary effect 850 of oversampling using an oversampling factor, in accordance with one or more example embodiments of the present disclosure.

FIG. 8D illustrates an exemplary effect 870 of oversampling using an oversampling factor, in accordance with one or more example embodiments of the present disclosure.

Black crosses in FIG. 8C and FIG. 8D may represent samples used to perform the l-2 norm corresponding to a l-2 norm minimum. FIG. 8C shows a lower PAPR than FIG. 8D.

Figure 9:
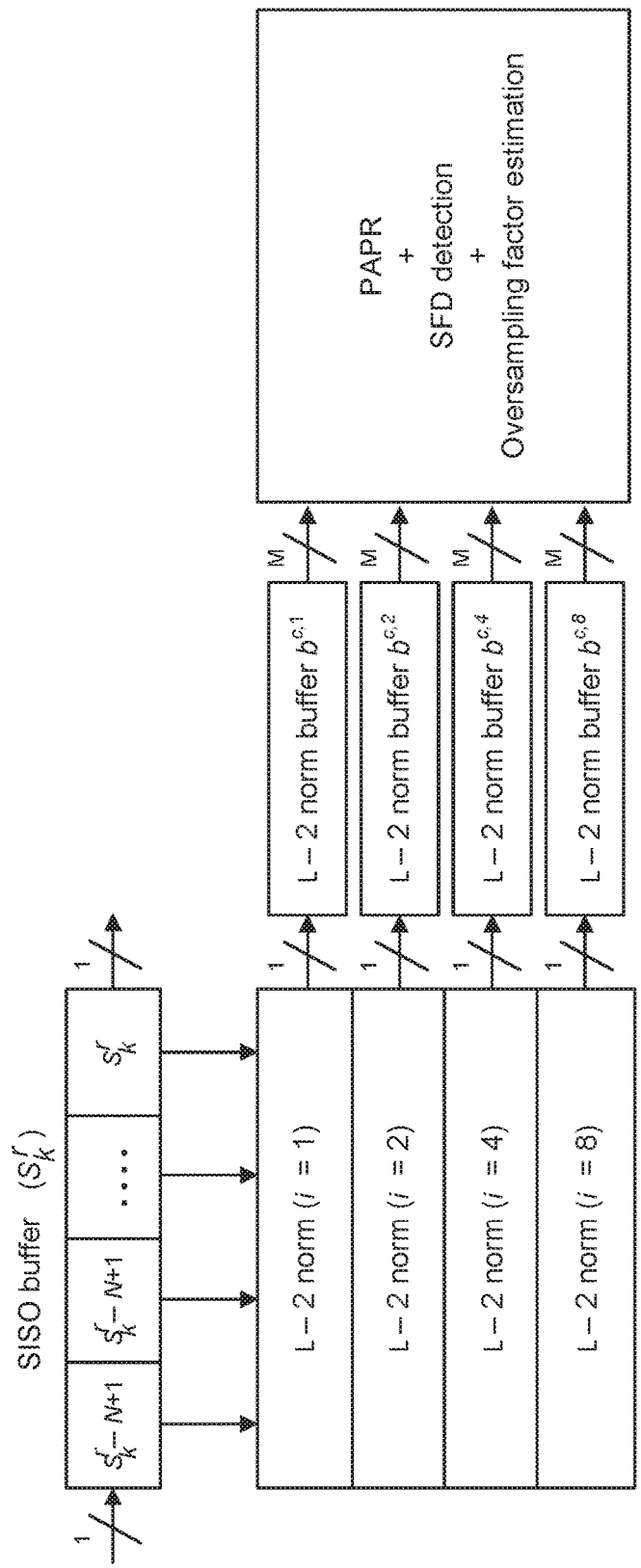
FIG. 9 illustrates an exemplary diagram of a camera communications start frame delimiter detector and oversampling factor estimator, in accordance with one or more example embodiments of the present disclosure.

FIG. 9 illustrates an exemplary diagram 900 of a camera communications SFD detector and oversampling factor estimator, in accordance with one or more example embodiments of the present disclosure.

Referring to FIG. 9, a serial in, serial out (SISO) buffer may store samples (e.g., samples Sk-N+1, Sk-N+1, ..., Sk). Using different oversampling rates, the respective L-2 norms (e.g., Euclidian/vector norms) may be determined and used to determine PAPR, to detect SFDs, and to estimate the oversampling factor.

Figure 10:
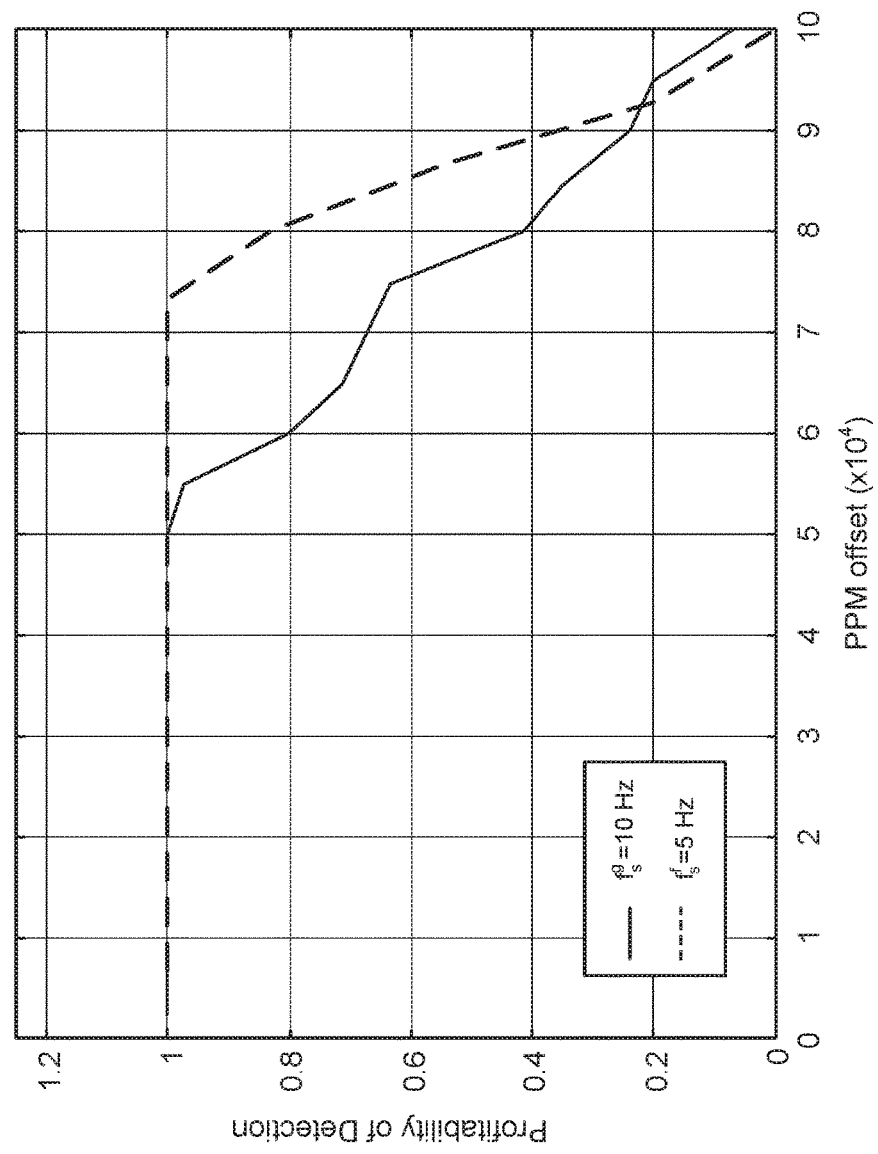
FIG. 10 illustrates an exemplary graph showing probability of start frame delimiter detection, in accordance with one or more example embodiments of the present disclosure.

FIG. 10 illustrates an exemplary graph 1000 showing probability of start frame delimiter detection, in accordance with one or more example embodiments of the present disclosure.

To test the validity of the algorithm, a numerical simulation may be performed with parameters shown below in Table 3.

TABLE 3

Numerical simulation parameters.

| Parameters | Values |
| --- | --- |
| Signal-to-Noise ratio | 100 dB |
| Mark/Space Frequencies | 150 Hz/120 Hz |
| $f_{cam}$ | 60 fps |
| Duty Cycle | 50% |
| Expo sure | 0.1 ms |
| Red Frequency | 5 Hz |
| Green Frequency | 10 Hz |
| Blue Frequency | 40 Hz |

For $f_s^b=40$ a probability of detection of 0 was determined. As shown in FIG. 10, the probability of detection of green and red are 1 up until about $5 \cdot 10^4$ PPM.

Multiple frequency offsets may be considered to test the robustness of the algorithm under different frequency offsets between the modulated light sources and the camera clock. A total of 1000 Monte Carlo realization per frequency clock offset may be considered. As shown in FIG. 10, the algorithm has a positive performance for frequency offsets of up to $5 \cdot 10^4$ PPM, with a probability of detection of 1. Correct oversampling factor estimation was obtained in all realizations, with 0% false detection. For each correct detection, correct oversampling estimation also was obtained.

Figure 11:
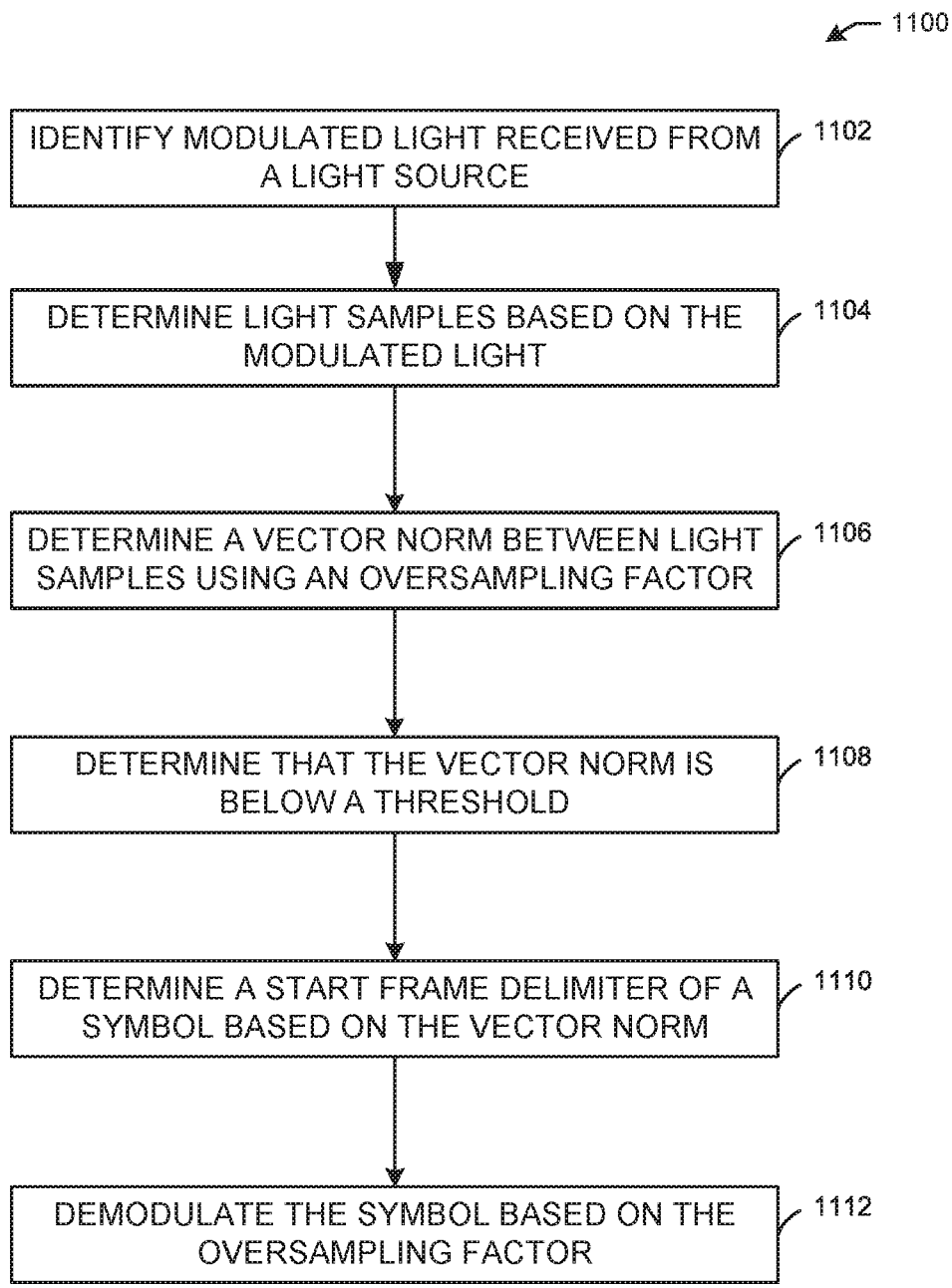
FIG. 11 depicts a flow diagram of an illustrative process for enhanced frequency offset and start frame delimiter detection, in accordance with one or more example embodiments of the present disclosure.

FIG. 11 depicts a flow diagram of an illustrative process for enhanced frequency offset and start frame delimiter detection, in accordance with one or more example embodiments of the present disclosure.

At block 1102, processing circuitry of a device (e.g., receiver device 102 of FIG. 1) may identify modulated light received from a light source. The device may capture frames of video (e.g., images) and identify ROIs of light in images. The modulated light may be received at a frame rate, and the modulated light may be associated with pixel clusters.

At block 1104, the processing circuitry of the device may determine light samples based on the modulated light (e.g., based on the pixel clusters).

At block 1106, the processing circuitry of the device may determine a vector norm between a first light sample and a second light sample using an oversampling factor. The oversampling factor may indicate a rate at which the device oversamples a symbol of the modulated light in a frequency domain.

At block 1108, the processing circuitry of the device may determine that the vector norm is below a threshold.

At block 1110, the processing circuitry of the device may determine a SFD based on the vector norm, the SFD including first samples of the symbol, wherein the first samples may be quantized to a first value, wherein the SFD precedes second samples of the symbol, and wherein the second samples may be quantized to one or more second values different from the first value.

At block 1112, the processing circuitry of the device may demodulate the symbol based on the oversampling factor (e.g., using Table 1 and Table 2).

FIG. 12 shows a functional diagram of an exemplary device 1200 in accordance with some embodiments. In one embodiment, FIG. 12 illustrates a functional block diagram of a device that may be suitable for use as a receiver device 102 (FIG. 1) or a transmitter device 120 (FIG. 1) in accordance with some embodiments. The device 1200 may also be suitable for use as a handheld device, a mobile device, a camera, a cellular telephone, a smartphone, a tablet, a netbook, a wireless terminal, a laptop computer, a wearable computer device, a femtocell, a high data rate (HDR) subscriber station, or other personal communication system (PCS) device.

The device 1200 may include communications circuitry 1202 and a transceiver 1210 for transmitting and receiving signals to and from other communication stations using one or more antennas 1201. The transceiver 1210 may be a device comprising both a transmitter and a receiver that are combined and share common circuitry (e.g., communication circuitry 1202). The communications circuitry 1202 may include amplifiers, filters, mixers, analog to digital and/or digital to analog converters. The transceiver 1210 may transmit and receive analog or digital signals. The transceiver 1210 may allow reception of signals during transmission periods. This mode is known as full-duplex, and may require the transmitter and receiver to operate on different frequencies to minimize interference between the transmitted signal and the received signal. The transceiver 1210 may operate in a half-duplex mode, where the transceiver 1210 may transmit or receive signals in one direction at a time.

The communications circuitry 1202 may include circuitry that may operate the physical layer (PHY) communications and/or media access control (MAC) communications for controlling access to the wireless medium, and/or any other communications layers for transmitting and receiving signals. The device 1200 may also include processing circuitry 1206 and memory 1208 arranged to perform the operations described herein. In some embodiments, the communications circuitry 1202 and the processing circuitry 1206 may be configured to perform operations detailed in FIGS. 2A, 2B, 3A, 3B, 4A, 4B, 5, 6, 9, and 11.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the device 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting and receiving message frames/light and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the device 1200 may be part of a portable camera or wireless communication device having a camera, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the device 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of light and/or RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the device 1200 may include one or more of a keyboard, a display, a non-volatile memory port, multiple antennas, a graphics processor, an application processor, speakers, and other mobile device elements. The display may be an LCD screen including a touch screen.

Although the device 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the device 1200 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the device 1200 may include one or more processors and may be configured with instructions stored on a computer-readable storage device.

FIG. 13 illustrates a block diagram of an example of a machine 1300 or system upon which any one or more of the techniques (e.g., methodologies) discussed herein may be performed. In other embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environments. The machine 1300 may be a camera, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a power management device 1332, a graphics display device 1310, an alphanumeric input device 1312 (e.g., a keyboard), and a user interface (UI) navigation device 1314 (e.g., a mouse). In an example, the graphics display device 1310, alphanumeric input device 1312, and UI navigation device 1314 may be a touch screen display. The machine 1300 may additionally include a storage device (i.e., drive unit) 1316, a signal generation device 1318 (e.g., a speaker), an enhanced camera device 1319, a network interface device/transceiver 1320 coupled to antenna(s) 1330, and one or more sensors 1328, such as a global positioning system (GPS) sensor, a compass, an accelerometer, or other sensor. The machine 1300 may include an output controller 1334, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1302 for generation and processing of the baseband signals and for controlling operations of the main memory 1304, the storage device 1316, and/or the enhanced camera device 1319. The baseband processor may be provided on a single radio card, a single chip, or an integrated circuit (IC).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, or within the hardware processor 1302 during execution thereof by the machine 1300. In an example, one or any combination of the hardware processor 1302, the main memory 1304, the static memory 1306, or the storage device 1316 may constitute machine-readable media.

The enhanced camera device 1319 may carry out or perform any of the operations and processes (e.g., the process 1100 of FIG. 11) described and shown above. The enhanced camera device may capture video/image data, such as light, and may facilitate operations associated with analyzing the light according to the processes described and shown above.

The enhanced camera device 1319 may: identify modulated light received from a light source, wherein the modulated light is received at a frame rate, and wherein the modulated light is associated with pixel clusters; determine light samples based on the pixel clusters, the light samples comprising a first light sample and a second light sample; determine a vector norm between the first light sample and the second light sample using an oversampling factor, wherein the oversampling factor indicates a rate at which the device oversamples a symbol of the modulated light in a frequency domain; determine that the vector norm is below a threshold; determine a start frame delimiter (SFD) based on the vector norm, the SFD comprising first samples of the symbol, wherein the first samples are quantized to a first value, wherein the SFD precedes second samples of the symbol, wherein the second samples are quantized to one or more second values different from the first value; and demodulate the symbol based on the oversampling factor.

The enhanced camera device 1319 may perform operations including: identifying, at a device, modulated light received from a light source, wherein the modulated light is received at a frame rate, and wherein the modulated light is associated with pixel clusters; determining light samples based on the pixel clusters, the light samples comprising a first light sample and a second light sample; determining a vector norm between the first light sample and the second light sample using an oversampling factor, wherein the oversampling factor indicates a rate at which the device oversamples a symbol of the modulated light in a frequency domain; determining that the vector norm is below a threshold; determining a start frame delimiter (SFD) based on the vector norm, the SFD comprising first samples of the symbol, wherein the first samples are quantized to a first value, wherein the SFD precedes second samples of the symbol, wherein the second samples are quantized to one or more second values different from the first value; and demodulating the symbol based on the oversampling factor.

The enhanced camera device 1319 may identify boundaries of a light signal inaccurately, resulting in errors in sampling the light signal and in identifying the data associated with the light signal. By defining SFDs, which may include multiple guard periods, a device may identify the beginning of a symbol. SFDs may serve effectively as light preambles and may facilitate a device's ability to identify light symbols may improve.

The enhanced camera device 1319 may detect the presence of modulated light sources compatible with UFSOOK waveforms The start frame delimiter present in such waveforms may be used to enable detection and also align a camera receiver with modulated light sources to proceed with the demodulation/data extraction. The algorithm may enable communication at different data rates using a constant camera frame rate. The algorithm may provide CamCom to camera devices and to enable use cases such as indoor positioning or augmented reality experiences.

The enhanced camera device 1319 may detect and correct the effect of frequency offsets when sampling UFSOOK signals. Rather than taking two samples per symbol for demodulation, six or more samples may be taken, increasing the symbol duration (e.g., to six camera fame periods $1/c_{fps}$ when using six samples, where $c_{fps}$ may be the camera frame rate). Frames one and six of the six samples may be used to track frequency offset between the camera and light modulation clock, while frames 2-5 may be used to extract modulated data. Increasing the number of samples per symbol may reduce overall system throughput, however, the symbols and use of an SFD may facilitate more effective tracking of frequency offsets between the camera and modulated clock to mitigate interference.

The enhanced camera device 1319 may: (1) Detect lights at the camera image plane and associate pixel clusters with each of them. Pixel clusters are processed to generate a single sample per detected light source and frame. (2) Store samples from light source in an internal buffer. Once the buffer is full, normalize the stored samples every time a new sample enters the buffer. (3) Compute the l-2 norm between the stored samples. (4) Trigger detection of SFD if l-2 norm is below a threshold. (5) Store the resulting l-2 norm into a buffer and find the smallest sample below the threshold. Use the temporal location of the sample as the beginning of a SFD and start demodulating. Note that the above algorithm only operates correctly when both the camera and the modulated LED clocks are properly configured ($f_s = f_{cam}/6$).

The enhanced camera device 1319 may detect when $f_s > (f_{cam}/6)$ or when lights have random modulation patterns, preventing the camera receiver from attempting data extraction from the selected light source. Color LED sources (red, blue and green) may be considered, where each color may be modulated using a different frequency. Frequencies for red ($f_{s,r}$), green ($f_{s,g}$) and blue ($f_{s,b}$) may be used to indicate the modulation frequency of red, green and blue colors, respectively. The color frequencies may be represented by $f_{s,r} < f_{cam}/6$, $f_{s,g} = f_{cam}/6$ and $f_{s,b} > f_{cam}/6$.

The enhanced camera device 1319 may: (1) Detect lights at the camera image plane and associate pixel clusters with each of them. Pixel clusters are processed to generate a single sample per detected light source, color and frame. (2) Store samples from light source in internal buffer. Once the buffer is full, normalize the stored samples every time a new sample enters the buffer. (3) Compute the l-2 norm between the stored samples and the expected SFD sequence. A camera frame rate for sampling may be different than expected. Oversampling may refer to sampling transmitted symbols using a camera frame rate higher than what it is expected. For example, if $$f_s = \frac{f_{cam}}{6} = 5, \text{ with } f_{cam} = 30,$$

an oversampling factor of 8 would mean that $f_{cam,oversampled} = 8 f_{cam} = 240$ fps. Using the frame rates 30, 60, 120 and 240, over-samplings of up to 8× may be obtained. (4) Store resulting l-2 norm into a buffer. (5) Trigger detection of SFD if the l-2 norm is below a threshold. (6) For a given camera frame rate and color, if after the previous steps multiple SFDs are detected for different oversampling rates, select lowest oversampling rate to estimate the camera oversampling factor. (7) Using the estimated camera oversampling factor, find the smallest l-2 sample below the threshold and use its temporal location as the beginning of a SFD for each color. (8) Proceed to demodulate data taking into account the oversampling factor.

The enhanced camera device 1319 may modulate the beginning and end of a symbol (e.g., a guard period) using a square waveform with frequency cwf>>cfps. The guard periods may be defined as the first and last seconds of the 6/cfps seconds of the symbol, where cfps may refer to a camera frame rate. After camera integration during the camera exposure time (e.g., exposure time is set up to be >>1/cwf), the camera may extract the direct current (DC) value of the modulated waveform, which may be intended to be different from a light ON intensity level (e.g., a DC value may depend on the duty cycle of the modulated waveform). Note that perceived light intensity may be different from light ON and OFF levels when sampling in the boundaries of a symbol. The information may be used to determine correct sampling and compensate the frequency offset effect. Light patterns with zero or one state transition (e.g., between ON and OFF) may be demodulated as a 0 (e.g., a space frequency). Patterns with two or more state transitions may be demodulated as a 1 (e.g., a mark frequency).

The enhanced camera device 1319 may: (1) Record a video using an appropriate exposure time. (2) Identify modulated lights and define regions of interest (ROIs) in an image of the video. (3) Synchronize using a SFD. Initialize the tracking algorithm by detecting the first data bit. (4) Analyze samples to make a tracking and bit decision (e.g., whether to compensate for fast or slow sampling). (5) Extract payload until finished or until next SFD arrives. For example, at step (4), if the sampling is slow (e.g., there is a negative frequency offset), the receiving device may keep the current last sample and load the next five samples. If the sampling is normal, the next six samples may be loaded. If the sampling is fast (e.g., there is a positive frequency offset), the receiving device may load the next seven samples and keep the last six samples. If a camera is too fast or slow, the camera may drift forward or backward to a next or previous symbol, resulting in the inaccurate processing of the light.

It is understood that the above are only a subset of what the enhanced camera device 1319 may be configured to perform and that other functions included throughout this disclosure may also be performed by the enhanced camera device 1319.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1300 and that cause the machine 1300 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device/transceiver 1320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.15.7 family of standards for visible light communications, the 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1320 may include one or more physical jacks (e.g., Ethernet, coaxial, or phone jacks) or one or more antennas to connect to the communications network 1326. In an example, the network interface device/transceiver 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1300 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "receiver device," "transmitter device," "user device," "communication station," "station," "handheld device," "mobile device," "wireless device" and "user equipment" (UE) as used herein refers to a wireless communication device such as a camera, a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single input multiple output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device, the device comprising processing circuitry coupled to storage, the processing circuitry configured to: identify modulated light received from a light source, wherein the modulated light is received at a frame rate, and wherein the modulated light is associated with pixel clusters; determine light samples based on the pixel clusters, the light samples comprising a first light sample and a second light sample; determine a vector norm between the first light sample and the second light sample using an oversampling factor, wherein the oversampling factor indicates a rate at which the device oversamples a symbol of the modulated light in a frequency domain; determine that the vector norm is below a threshold; determine a start frame delimiter (SFD) based on the vector norm, the SFD comprising first samples of the symbol, wherein the first samples are quantized to a first value, wherein the SFD precedes second samples of the symbol, wherein the second samples are quantized to one or more second values different from the first value; and demodulate the symbol based on the oversampling factor.

Example 2 may include the device of claim 1, wherein the SFD is a first SFD, wherein the processing circuitry is further configured to: determine a second SFD, the second SFD comprising third samples of the symbol, wherein the second SFD proceeds the second samples, wherein the third samples are quantized to the first value, wherein to demodulate the symbol comprises to demodulate the second samples; and determine the next six samples of the symbol subsequent to the second samples.

Example 3 may include the device of claim 1 and/or some other example herein, wherein the SFD is a first SFD, wherein the processing circuitry is further configured to: determine a second SFD, the second SFD comprising third samples of the symbol, wherein the second SFD proceeds the second samples, wherein the third samples are quantized to a third value different from the first value, wherein to demodulate the symbol comprises to demodulate three of the second samples and one of the first samples; and determine the next five samples of the symbol subsequent to the second samples.

Example 4 may include the device of claim 1 and/or some other example herein, wherein the SFD is a first SFD, wherein the processing circuitry is further configured to: determine a second SFD, the second SFD comprising third samples of the symbol, wherein the second SFD proceeds the second samples, wherein the third samples are quantized to a third value different from the first value, wherein to demodulate the symbol comprises to demodulate three of the second samples and one of the third samples; and determine the next seven samples of the symbol subsequent to the second samples.

Example 5 may include the device of claim 1 and/or some other example herein, wherein the one or more second values comprise a 0 and a 1, wherein the processing circuitry is further configured to: determine, based on the second samples, a number of transitions between 0 and 1 values; and determine that the number of transitions is 0 or 1, wherein to demodulate the symbol comprises to determine that the second samples are associated with a 0 value.

Example 6 may include the device of claim 1 and/or some other example herein, wherein the one or more second values comprise a 0 and a 1, wherein the processing circuitry is further configured to: determine, based on the second samples, a number of transitions between 0 and 1 values; and determine that the number of transitions is at least two, wherein to demodulate the symbol comprises to determine that the second samples are associated with a 1 value.

Example 7 may include the device of claim 1 and/or some other example herein, wherein the vector norm is a first vector norm, wherein the SFD is a first SFD, wherein the oversampling factor is a first oversampling factor, wherein the processing circuitry is further configured to: determine a second vector norm between at least two of the light samples; determine a second SFD based on the second vector norm, wherein the second SFD is associated with a second oversampling factor; and determine that the first oversampling factor is less than the second oversampling factor.

Example 8 may include the device of claim 1 and/or some other example herein, wherein the processing circuitry is further configured to determine that the vector norm is the smallest vector norm of two or more vector norms associated with the oversampling factor, wherein the two or more vector norms are below the threshold.

Example 9 may include the device of claim 1 and/or some other example herein, wherein to determine the SFD comprises the processing circuitry being further configured to determine a temporal location associated with the vector norm.

Example 10 may include the device of claim 1 and/or some other example herein, wherein the first samples comprise at least six samples.

Example 11 may include the device of claim 1 and/or some other example herein, wherein the processing circuitry is further configured to store the vector norm in a buffer of one or more buffers associated with the device, wherein the number of the one or more buffers is based on a maximum number of oversampling factors associated with the frame rate.

Example 12 may include a non-transitory computer-readable medium storing computer-executable instructions which when executed by one or more processors result in performing operations comprising: identifying, at a device, modulated light received from a light source, wherein the modulated light is received at a frame rate, and wherein the modulated light is associated with pixel clusters; determining light samples based on the pixel clusters, the light samples comprising a first light sample and a second light sample; determining a vector norm between the first light sample and the second light sample using an oversampling factor, wherein the oversampling factor indicates a rate at which the device oversamples a symbol of the modulated light in a frequency domain; determining that the vector norm is below a threshold; determining a start frame delimiter (SFD) based on the vector norm, the SFD comprising first samples of the symbol, wherein the first samples are quantized to a first value, wherein the SFD precedes second samples of the symbol, wherein the second samples are quantized to one or more second values different from the first value; and demodulating the symbol based on the oversampling factor.

Example 13 may include the non-transitory computer-readable medium of claim 12, wherein the SFD is a first SFD, the operations further comprising: determining a second SFD, the second SFD comprising third samples of the symbol, wherein the second SFD proceeds the second samples, wherein the third samples are quantized to the first value, wherein demodulating the symbol comprises demodulating the second samples; and determining the next six samples of the symbol subsequent to the second samples.

Example 14 may include the non-transitory computer-readable medium of claim 12 and/or some other example herein, wherein the SFD is a first SFD, the operations further comprising: determining a second SFD, the second SFD comprising third samples of the symbol, wherein the second SFD proceeds the second samples, wherein the third samples are quantized to a third value different from the first value, wherein demodulating the symbol comprises demodulating three of the second samples and one of the first samples; and determining the next five samples of the symbol subsequent to the second samples.

Example 15 may include the non-transitory computer-readable medium of claim 12 and/or some other example herein, wherein the SFD is a first SFD, the operations further comprising: determining a second SFD, the second SFD comprising third samples of the symbol, wherein the second SFD proceeds the second samples, wherein the third samples are quantized to a third value different from the first value, wherein demodulating the symbol comprises demodulating three of the second samples and one of the third samples; and determining the next seven samples of the symbol subsequent to the second samples.

Example 16 may include the non-transitory computer-readable medium of claim 12 and/or some other example herein, wherein the one or more second values comprise a 0 and a 1, the operations further comprising: determining, based on the second samples, a number of transitions between 0 and 1 values; and determining that the number of transitions is 0 or 1, wherein demodulating the symbol comprises determining that the second samples are associated with a 0 value.

Example 17 may include the non-transitory computer-readable medium of claim 12 and/or some other example herein, wherein the one or more second values comprise a 0 and a 1, the operations further comprising: determining, based on the second samples, a number of transitions between 0 and 1 values; and determining that the number of transitions is at least two, wherein to demodulate the symbol comprises determining that the second samples are associated with a 1 value.

Example 18 may include the non-transitory computer-readable medium of claim 12 and/or some other example herein, wherein the vector norm is a first vector norm, wherein the SFD is a first SFD, wherein the oversampling factor is a first oversampling factor, the operations further comprising: determining a second vector norm between at least two of the light samples; determining a second SFD based on the second vector norm, wherein the second SFD is associated with a second oversampling factor; and determining that the first oversampling factor is less than the second oversampling factor.

Example 19 may include the non-transitory computer-readable medium of claim 12 and/or some other example herein, the operations further comprising determining that the vector norm is the smallest vector norm of two or more vector norms associated with the oversampling factor, wherein the two or more vector norms are below the threshold.

Example 20 may include a method, comprising: identifying, by processing circuitry of a device, modulated light received from a light source, wherein the modulated light is received at a frame rate, and wherein the modulated light is associated with pixel clusters; determining, by the processing circuitry, light samples based on the pixel clusters, the light samples comprising a first light sample and a second light sample; determining, by the processing circuitry, a vector norm between the first light sample and the second light sample using an oversampling factor, wherein the oversampling factor indicates a rate at which the device oversamples a symbol of the modulated light in a frequency domain; determining, by the processing circuitry, that the vector norm is below a threshold; determining, by the processing circuitry, a start frame delimiter (SFD) based on the vector norm, the SFD comprising first samples of the symbol, wherein the first samples are quantized to a first value, wherein the SFD precedes second samples of the symbol, wherein the second samples are quantized to one or more second values different from the first value; and demodulating, by the processing circuitry, the symbol based on the oversampling factor.

Example 21 may include an apparatus comprising means for: identifying, by processing circuitry of a device, modulated light received from a light source, wherein the modulated light is received at a frame rate, and wherein the modulated light is associated with pixel clusters; determining, by the processing circuitry, light samples based on the pixel clusters, the light samples comprising a first light sample and a second light sample; determining, by the processing circuitry, a vector norm between the first light sample and the second light sample using an oversampling factor, wherein the oversampling factor indicates a rate at which the device oversamples a symbol of the modulated light in a frequency domain; determining, by the processing circuitry, that the vector norm is below a threshold; determining, by the processing circuitry, a start frame delimiter (SFD) based on the vector norm, the SFD comprising first samples of the symbol, wherein the first samples are quantized to a first value, wherein the SFD precedes second samples of the symbol, wherein the second samples are quantized to one or more second values different from the first value; and demodulating, by the processing circuitry, the symbol based on the oversampling factor.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
identify modulated light received from a light source, wherein the modulated light is received at a frame rate, and wherein the modulated light is associated with pixel clusters;
determine light samples based on the pixel clusters, the light samples comprising a first light sample and a second light sample;
determine a vector norm between the first light sample and the second light sample using an oversampling factor, wherein the oversampling factor indicates a rate at which the device oversamples a symbol of the modulated light in a frequency domain;
determine that the vector norm is below a threshold;

identify, at a first time, a start frame delimiter (SFD) of the modulated light based on the vector norm, the SFD comprising first samples of the symbol, wherein the first samples of the symbol are quantized to a first value;

identify, at a second time after the first time, second samples of the symbol, wherein the second samples of the symbol are quantized to one or more second values different from the first value; and demodulate the symbol based on the oversampling factor.

2. The device of claim 1, wherein the SFD is a first SFD of the modulated light, wherein the processing circuitry is further configured to:

identify, at a third time preceding the second time, a second SFD of the modulated light, the second SFD comprising third samples of the symbol, wherein the third samples are quantized to the first value, wherein demodulating the symbol comprises demodulating the second samples of the symbol; and determine a next six samples of the symbol subsequent to the second samples of the symbol.

3. The device of claim 1, wherein the SFD is a first SFD of the modulated light, wherein the processing circuitry is further configured to:

identify, at a third time preceding the second time, a second SFD of the modulated light, the second SFD comprising third samples of the symbol, wherein the third samples are quantized to a third value different from the first value, wherein demodulating the symbol comprises demodulating three of the second samples of the symbol and one of the first samples of the symbol; and determine a next five samples of the symbol subsequent to the second samples of the symbol.

4. The device of claim 1, wherein the SFD is a first SFD of the modulated light, wherein the processing circuitry is further configured to:

identify, at a third time preceding the second time, a second SFD of the modulated light, the second SFD comprising third samples of the symbol, wherein the third samples are quantized to a third value different from the first value, wherein demodulating the symbol comprises demodulating three of the second samples of the symbol and one of the third samples of the symbol; and determine a next seven samples of the symbol subsequent to the second samples of the symbol.

5. The device of claim 1, wherein the one or more second values comprise a 0 and a 1, wherein the processing circuitry is further configured to:

determine, based on the second samples of the symbol, a number of transitions between 0 and 1 values; and determine that the number of transitions is 0 or 1, wherein demodulating the symbol comprises determining that the second samples of the symbol are associated with a 0 value.

6. The device of claim 1, wherein the one or more second values comprise a 0 and a 1, wherein the processing circuitry is further configured to:

determine, based on the second samples of the symbol, a number of transitions between 0 and 1 values; and determine that the number of transitions is at least two, wherein demodulating the symbol comprises determining that the second samples of the symbol are associated with a 1 value.

7. The device of claim 1, wherein the vector norm is a first vector norm, wherein the SFD is a first SFD of the modulated light, wherein the oversampling factor is a first oversampling factor, wherein the processing circuitry is further configured to:

determine a second vector norm between at least two of the light samples;

identify a second SFD of the modulated light based on the second vector norm, wherein the second SFD is associated with a second oversampling factor; and determine that the first oversampling factor is less than the second oversampling factor.

8. The device of claim 1, wherein the processing circuitry is further configured to determine that the vector norm is a smallest vector norm of two or more vector norms associated with the oversampling factor, wherein the two or more vector norms are below the threshold.

9. The device of claim 1, wherein identifying the SFD comprises configuring the processing circuitry to determine a temporal location associated with the vector norm.

10. The device of claim 1, wherein the first samples of the symbol comprise at least six samples.

11. The device of claim 1, wherein the processing circuitry is further configured to store the vector norm in a buffer of one or more buffers associated with the device, wherein a number of the one or more buffers is based on a maximum number of oversampling factors associated with the frame rate.

12. A non-transitory computer-readable medium storing computer-executable instructions which when executed by one or more processors result in performing operations comprising:

identifying, at a device, modulated light received from a light source, wherein the modulated light is received at a frame rate, and wherein the modulated light is associated with pixel clusters;

determining light samples based on the pixel clusters, the light samples comprising a first light sample and a second light sample;

determining a vector norm between the first light sample and the second light sample using an oversampling factor, wherein the oversampling factor indicates a rate at which the device oversamples a symbol of the modulated light in a frequency domain;

determining that the vector norm is below a threshold;

identifying, at a first time, a start frame delimiter (SFD) of the modulated light based on the vector norm, the SFD comprising first samples of the symbol, wherein the first samples of the symbol are quantized to a first value;

identifying, at a second time after the first time, second samples of the symbol, wherein the second samples of the symbol are quantized to one or more second values different from the first value; and demodulating the symbol based on the oversampling factor.

13. The non-transitory computer-readable medium of claim 12, wherein the SFD is a first SFD of the modulated light, the operations further comprising:

identifying, at a third time preceding the first time, a second SFD of the modulated light, the second SFD comprising third samples of the symbol, wherein the third samples are quantized to the first value, wherein demodulating the symbol comprises demodulating the second samples of the symbol; and determining a next six samples of the symbol subsequent to the second samples of the symbol.

14. The non-transitory computer-readable medium of claim 12, wherein the SFD is a first SFD of the modulated light, the operations further comprising:
  identifying, at a third time preceding the first time, a second SFD of the modulated light, the second SFD comprising third samples of the symbol, wherein the third samples are quantized to a third value different from the first value, wherein demodulating the symbol comprises demodulating three of the second samples of the symbol and one of the first samples of the symbol; and
  determining a next five samples of the symbol subsequent to the second samples of the symbol.

15. The non-transitory computer-readable medium of claim 12, wherein the SFD is a first SFD of the modulated light, the operations further comprising:
  identifying, at a third time preceding the first time, a second SFD of the modulated light, the second SFD comprising third samples of the symbol, wherein the third samples are quantized to a third value different from the first value, wherein demodulating the symbol comprises demodulating three of the second samples of the symbol and one of the third samples of the symbol; and
  determining a next seven samples of the symbol subsequent to the second samples of the symbol.

16. The non-transitory computer-readable medium of claim 12, wherein the one or more second values comprise a 0 and a 1, the operations further comprising:
  determining, based on the second samples of the symbol, a number of transitions between 0 and 1 values; and
  determining that the number of transitions is 0 or 1, wherein demodulating the symbol comprises determining that the second samples of the symbol are associated with a 0 value.

17. The non-transitory computer-readable medium of claim 12, wherein the one or more second values comprise a 0 and a 1, the operations further comprising:
  determining, based on the second samples of the symbol, a number of transitions between 0 and 1 values; and
  determining that the number of transitions is at least two, wherein demodulating the symbol comprises determining that the second samples of the symbol are associated with a 1 value.

18. The non-transitory computer-readable medium of claim 12, wherein the vector norm is a first vector norm, wherein the SFD is a first SFD of the modulated light, wherein the oversampling factor is a first oversampling factor, the operations further comprising:
  determining a second vector norm between at least two of the light samples;
  identifying a second SFD of the modulated light based on the second vector norm, wherein the second SFD is associated with a second oversampling factor; and
  determining that the first oversampling factor is less than the second oversampling factor.

19. The non-transitory computer-readable medium of claim 12, the operations further comprising determining that the vector norm is a smallest vector norm of two or more vector norms associated with the oversampling factor, wherein the two or more vector norms are below the threshold.

20. A method, comprising:
  identifying, by processing circuitry of a device, modulated light received from a light source, wherein the modulated light is received at a frame rate, and wherein the modulated light is associated with pixel clusters;
  determining, by the processing circuitry, light samples based on the pixel clusters, the light samples comprising a first light sample and a second light sample;
  determining, by the processing circuitry, a vector norm between the first light sample and the second light sample using an oversampling factor, wherein the oversampling factor indicates a rate at which the device oversamples a symbol of the modulated light in a frequency domain;
  determining, by the processing circuitry, that the vector norm is below a threshold;
  identifying, by the processing circuitry, at a first time, a start frame delimiter (SFD) of the modulated light based on the vector norm, the SFD comprising first samples of the symbol, wherein the first samples are quantized to a first value;
  identifying, by the processing circuitry, at a second time after the first time, second samples of the symbol, wherein the second samples are quantized to one or more second values different from the first value; and
  demodulating, by the processing circuitry, the symbol based on the oversampling factor.

* * * * *